US009797412B2

(12) United States Patent
Le Roy et al.

(10) Patent No.: US 9,797,412 B2
(45) Date of Patent: Oct. 24, 2017

(54) NOISE SUPPRESSION SYSTEM

(71) Applicant: Kohler Co., Kohler, WI (US)

(72) Inventors: Tyler W. Le Roy, Plymouth, WI (US); Jonathan T. Bykowski, Shorewood, WI (US); Roger W. Albert, Plymouth, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 15/208,268

(22) Filed: Jul. 12, 2016

(65) Prior Publication Data

US 2016/0319844 A1    Nov. 3, 2016

Related U.S. Application Data

(63) Continuation of application No. 13/839,907, filed on Mar. 15, 2013, now Pat. No. 9,388,731.

(51) Int. Cl.
*F04D 29/66* (2006.01)
*F04D 29/58* (2006.01)
(Continued)

(52) U.S. Cl.
CPC ......... *F04D 29/665* (2013.01); *A01D 34/826* (2013.01); *F01P 5/02* (2013.01);
(Continued)

(58) Field of Classification Search
CPC .... F04D 29/665; F04D 17/16; F04D 29/4226; F01P 11/12; F02F 1/065
(Continued)

(56) References Cited

U.S. PATENT DOCUMENTS 3,521,726 A * 7/1970 Fritz ................. F02B 77/13
123/195 C
3,530,840 A * 9/1970 Fritz ................. F02B 77/13
123/195 C
(Continued)

FOREIGN PATENT DOCUMENTS

CN          2151261       12/1993
CN          2787715        6/2005
(Continued)

OTHER PUBLICATIONS

Corresponding Chinese Office Action dated Jul. 19, 2016.
(Continued)

*Primary Examiner* — Jason Shanske
*Assistant Examiner* — Jason T Newton
(74) *Attorney, Agent, or Firm* — The Belles Group, P.C.

(57) ABSTRACT

A noise suppression system for an air-cooled internal combustion engine is disclosed. The system may include an acoustically designed shroud forming a cavity and configured for attenuating noise produced by a cooling air fan associated with the engine. In one system, the shroud is mountable on a housing of the air fan. A pair of air inlet passages may be provided which are operable to draw ambient cooling air into the shroud to the fan. The air inlet passages are acoustically configured and tuned to attenuate noise generated by the fan. In one system, the air inlet passages may each be formed in a rear quadrant of the shroud. Various configurations of the shroud may include quarter wave resonators and/or micro-perforated panels to further attenuate fan noise.

16 Claims, 42 Drawing Sheets

(51) Int. Cl.
*F01P 11/12* (2006.01)
*F04D 17/16* (2006.01)
*F04D 29/42* (2006.01)
*A01D 34/82* (2006.01)
*F01P 5/02* (2006.01)
*F02F 1/06* (2006.01)
*F01P 5/06* (2006.01)

(52) U.S. Cl.
CPC .............. *F01P 11/12* (2013.01); *F02F 1/065* (2013.01); *F04D 17/16* (2013.01); *F04D 29/424* (2013.01); *F04D 29/4213* (2013.01); *F04D 29/4226* (2013.01); *F04D 29/582* (2013.01); *F01P 5/06* (2013.01)

(58) Field of Classification Search
USPC ....................................................... 181/206
See application file for complete search history.

(56) References Cited

U.S. PATENT DOCUMENTS

| | | | |
|---|---|---|---|
| 3,750,842 A * | 8/1973 | McCaffrey, Jr. | F02B 77/13 123/193.2 |
| 3,980,912 A * | 9/1976 | Panza | H02K 9/14 181/202 |
| 4,211,058 A | 7/1980 | Larsen | |
| 4,231,447 A | 11/1980 | Chapman | |
| 4,241,806 A | 12/1980 | Metzger | |
| 4,291,080 A | 9/1981 | Ely | |
| 4,312,421 A | 1/1982 | Pioch | |
| 4,421,201 A | 12/1983 | Nelson | |
| 4,850,093 A | 7/1989 | Parente | |
| 6,167,976 B1 | 1/2001 | O'Neill | |
| 6,290,022 B1 | 9/2001 | Wolf | |
| 6,358,106 B1 * | 3/2002 | Herrera | F02B 77/13 181/204 |
| 6,358,590 B1 | 3/2002 | Blair | |
| 6,617,002 B2 | 9/2003 | Wood | |
| 6,805,219 B2 | 10/2004 | Yasuda | |
| 6,918,740 B2 | 7/2005 | Lui | |
| 7,201,254 B2 | 4/2007 | Redmann | |
| 7,677,359 B2 | 3/2010 | Vigran | |
| 8,408,358 B1 | 4/2013 | Hermiller | |
| 8,408,359 B2 | 4/2013 | Lu | |
| 2001/0007292 A1 | 7/2001 | Yabf | |
| 2002/0079159 A1 * | 6/2002 | Liu | F04D 29/4213 181/210 |
| 2004/0026167 A1 * | 2/2004 | Larsen | F04D 29/665 181/293 |
| 2004/0083701 A1 | 5/2004 | Brower | |
| 2005/0117970 A1 | 6/2005 | Gaertner et al. | |
| 2007/0034446 A1 | 2/2007 | Proscia et al. | |
| 2008/0056882 A1 | 3/2008 | Clay | |
| 2008/0108032 A1 | 5/2008 | Tuhy et al. | |
| 2008/0128201 A1 * | 6/2008 | Yamaguchi | B32B 3/266 181/286 |
| 2008/0152480 A1 | 6/2008 | Ishikawa et al. | |
| 2008/0185217 A1 | 8/2008 | Baude | |
| 2008/0295518 A1 | 12/2008 | Reba et al. | |
| 2010/0212999 A1 | 8/2010 | Marion | |
| 2011/0002775 A1 | 1/2011 | Ma et al. | |
| 2011/0147177 A1 | 6/2011 | Sakai et al. | |
| 2011/0159797 A1 | 6/2011 | Beltman | |
| 2014/0034416 A1 | 2/2014 | Lui | |
| 2014/0151000 A1 | 6/2014 | Havel | |

FOREIGN PATENT DOCUMENTS

| | | |
|---|---|---|
| CN | 1903639 | 1/2007 |
| CN | 101205937 | 6/2008 |
| CN | 201502421 | 6/2010 |
| CN | 202413939 | 9/2012 |
| DE | 3120888 | 12/1982 |
| EP | 1172059 | 1/2002 |
| GB | 880194 | 10/1961 |
| JP | H1193670 | 4/1999 |
| JP | 2003022077 | 1/2003 |
| NL | 1029313 | 12/2006 |
| WO | WO 81/03201 | 11/1981 |
| WO | WO 2008/148443 | 12/2008 |

OTHER PUBLICATIONS

Tao, Z., et al., "Prediction of Sound-Absorbing Performance of Micro-Perforated Panels using the Transfer Matrix Method," University of Kentucky, 2005, pp. 1-4, Society of Automotive Engineers, Inc.

Liu, J., et al., "Enhancing micro-perforated panel attenuation by partitioning the adjoining cavity," Applied Acoustics 71 (2010), pp. 120-127.

Blanks, Joseph, "Optimal Design of an Enclosure for a Portable Generator," Virginia Polytechnic Institute and State University, Feb. 7, 1997, pp. 1-84, Blacksburg, VA.

Maa, Dah-You, "Potential of Microperforated Panel Absorber," J. Acoust. Soc. Am., 104 (5), Nov. 1998, pp. 2861-2866.

"Sound-Micro Noise Enclosures," Acoustical Surfaces, Inc., Chaska, MN.

Schultz, Theodore, "Acoustical Uses for Perforated Metals: Principles and Applications," Industrial Perforators Association, Inc., 1986, pp. 1-81.

"The new generation in sound absorbing", DeAmp Product Catalog, pp. 1-13, Norway.

* cited by examiner

NOISE SUPPRESSION SYSTEM

CROSS-REFERENCE TO RELATED APPLICATIONS

The present application claims the benefit of and is a continuation of U.S. patent application Ser. No. 13/839,907 filed Mar. 15, 2013; the entirety of which is incorporated herein by reference.

BACKGROUND OF THE INVENTION

The present invention generally relates to sound or noise suppression, and more particularly to attenuate cooling system noise pertaining to air cooled internal combustion engines.

Air cooled internal combustion engines are used to power outdoor equipment for a variety of applications including riding mowers, tractors, and others. Fans (sometimes referred to as "blowers") used in engine cooling systems may be a source of noise.

A noise suppression system for an engine is desirable.

SUMMARY OF THE INVENTION

A noise suppression system for an air cooled engine is disclosed that attenuates noise generated by operation of the engine's cooling fan or blower. In one aspect of the disclosure, the noise suppression system includes an acoustically designed shroud which in one configuration may be mounted on an air blower housing. The shroud may further be configured to define a cooling air inflow path for drawing ambient cooling air inwards towards the fan. The shroud may include any number of elongated air inlet passages (also referred to as "chambers") which are in fluid communication with the engine's fan and sonically configured to reflect and attenuate fan noise.

As disclosed herein, various shrouds may further include other noise suppression features including without limitation quarter wave resonators, micro-perforated panels, and fibrous materials which may be used alone or in combination to add to fan noise attenuation.

According to one aspect of the present disclosure, a noise suppression shroud for an engine includes a body defining a longitudinal axis and having a lower portion configured for mounting on a cooling air fan of the engine and an upper portion, a cavity formed in the body, and a quarter wave resonator disposed in the cavity and tuned to attenuate noise generated by the fan within or at a first range of frequencies, such as at the primary blade-pass frequencies. The quarter wave resonators may be comprised of a plurality of intersecting partitions forming a plurality of corresponding cells. In some shrouds, at least one micro-perforated panel may be disposed in the shroud which is tuned to attenuate (and/or otherwise reduce) noise within or at a second range of frequencies, such as a larger range of blade-pass frequencies. In various shrouds, the shroud may include any number of horizontally elongated air inlet passages which are in fluid communication with a fan impeller positioned in a top of the cooling air fan. A majority of each air inlet passage may be positioned in one of two rear quadrants defined by the shroud adjacent the rear of the engine.

According to another aspect of the present disclosure, a noise suppression system for an engine includes a shroud defining a longitudinal axis and configured for mounting on a cooling air fan associated with the engine, a cavity formed in the shroud, and at least one micro-perforated panel disposed in the shroud. The micro-perforated panel may be tuned to reduce noise generated by the fan within or at a first range of frequencies. Some noise suppression systems may further include a second micro-perforated panel disposed in the shroud. The second micro-perforated panel may be used to increase the effective frequency range of the micro-perforated panels.

According to another aspect of the present disclosure, a noise suppression system for an air cooled engine includes a shroud defining a longitudinal axis and configured for mounting on a housing of a cooling air fan associated with the engine, a cavity formed in the shroud and positioned over a fan impeller rotationally supported by the housing of the cooling air fan, and a pair of horizontally elongated air inlet passages each being formed in a rear quadrant of the shroud. The air inlet passages are in fluid communication with the cavity and operable to draw ambient cooling air into the shroud in a forward direction towards the fan impeller. The air inlet passages are acoustically configured to attenuate noise generated by the cooling air fan. In one system, the air inlet passages may include a plurality of angled sidewall surfaces configured for reflecting noise generated by the fan impeller.

BRIEF DESCRIPTION OF THE DRAWINGS

The features of the preferred embodiments will be described with reference to the following drawings where like elements are labeled similarly, and in which.

Figure 1A:
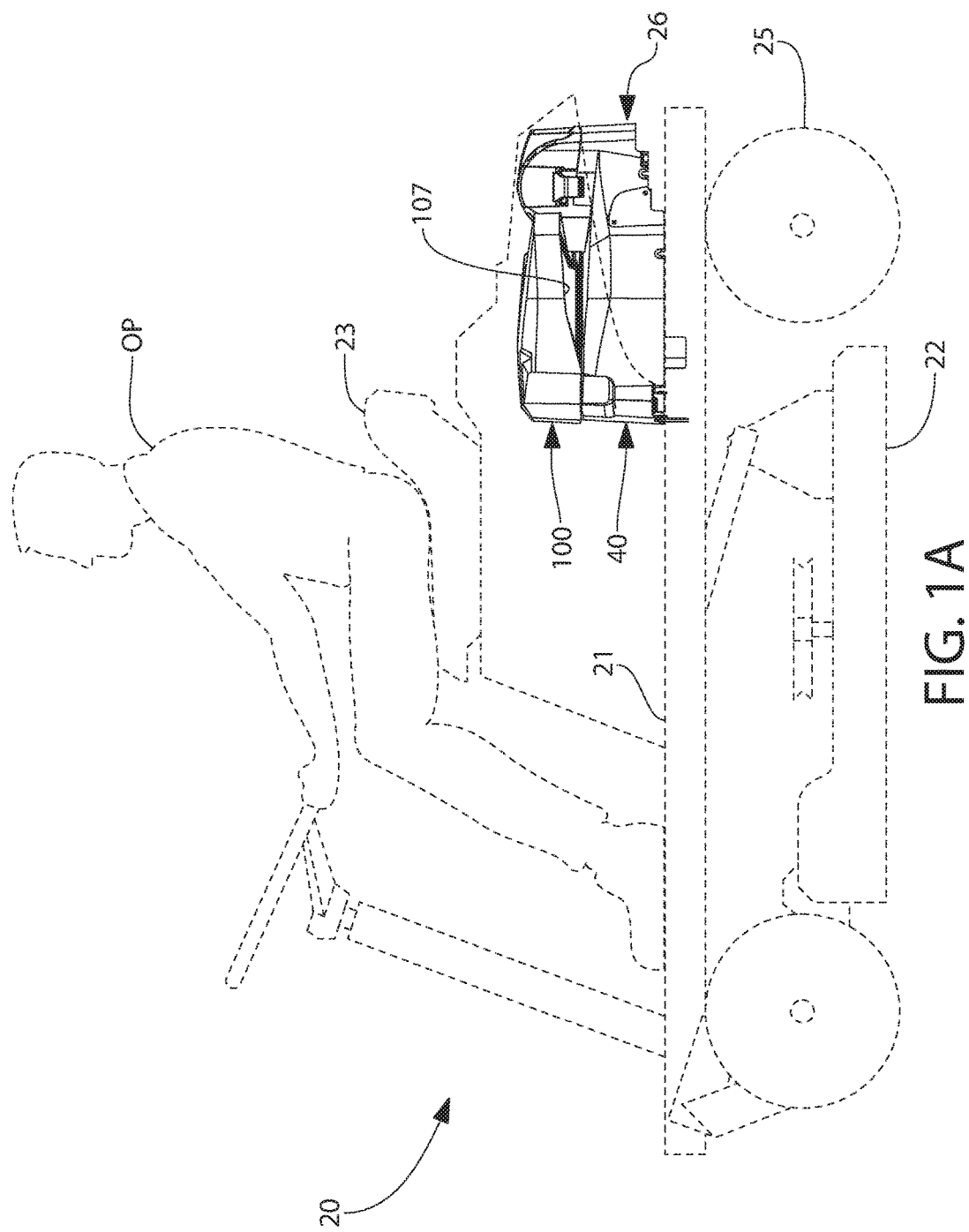
FIGS. 1A and 1B are side elevation and top plan views respectively of power equipment having an engine incorporating a noise suppression system according to the present disclosure.

All drawings are schematic and not necessarily to scale.

DETAILED DESCRIPTION OF EMBODIMENTS

The features and benefits of the present disclosure are illustrated and described herein by reference to exemplary embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise. The terms "sound" and "noise" may be used interchangeably herein unless specifically noted to the contrary.

Figure 1B:
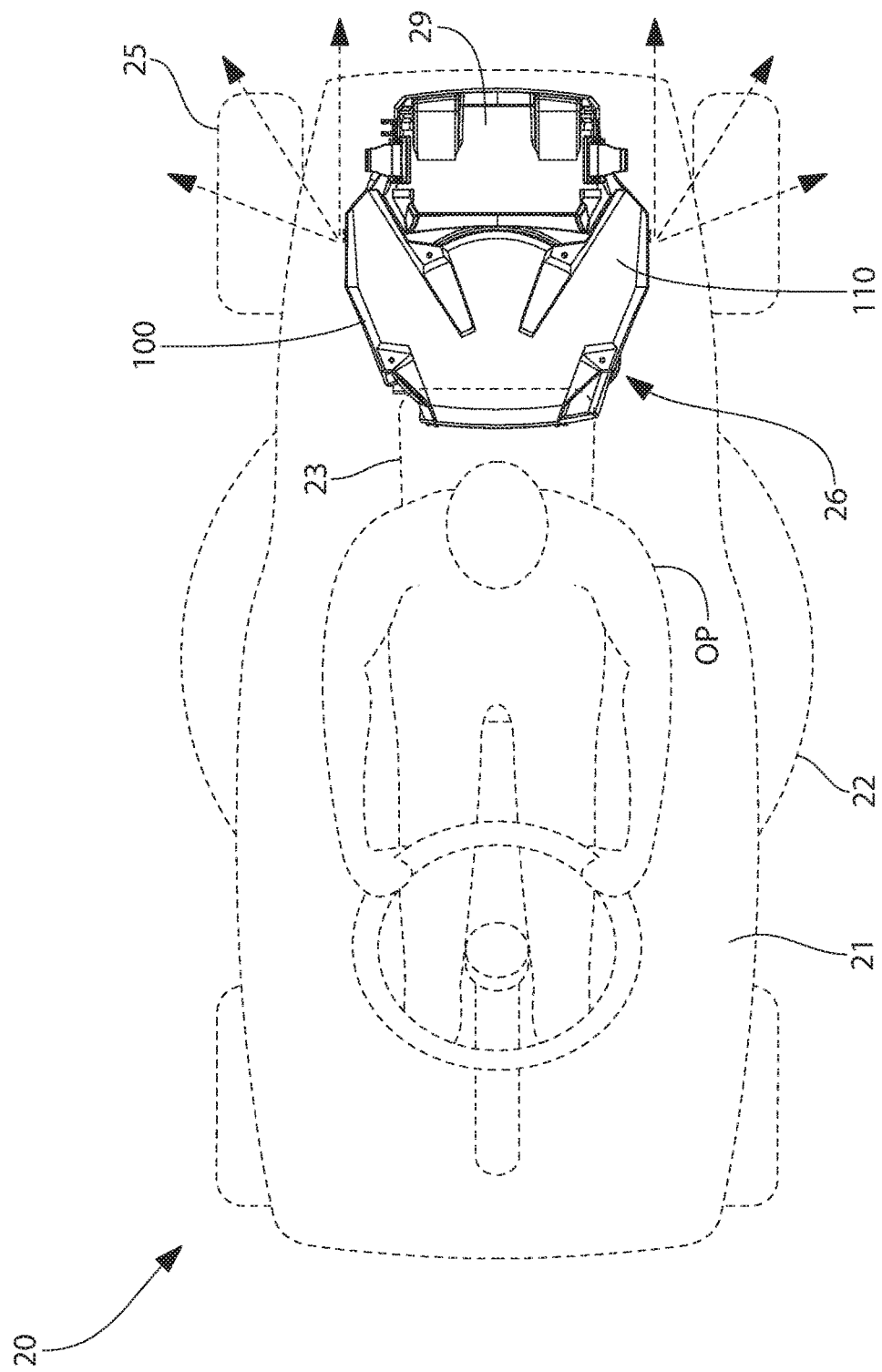
Figure 2:
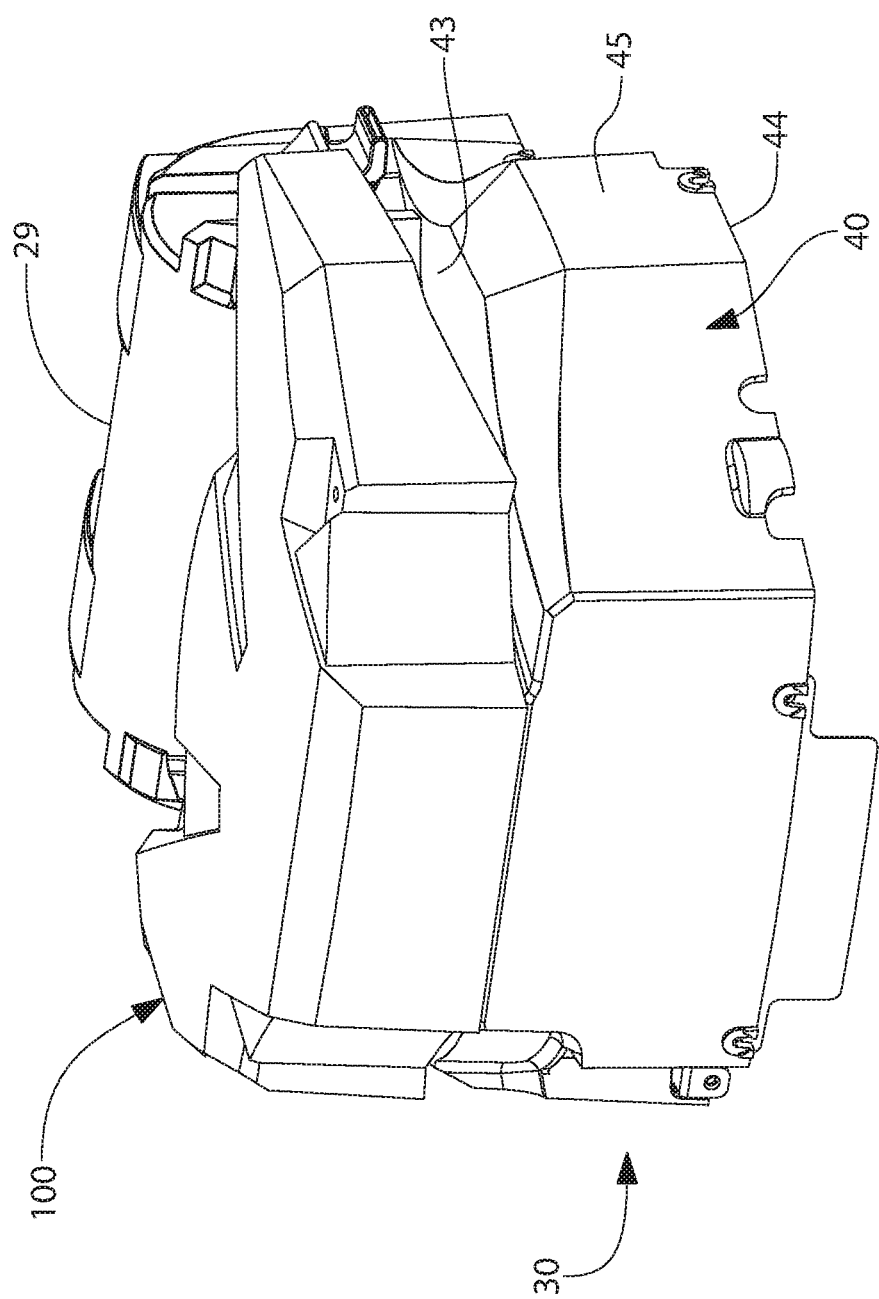
FIG. 2 is a front top perspective view of the cooling air blower of FIGS. 1A and 1B with noise suppression shroud.
Figure 3:
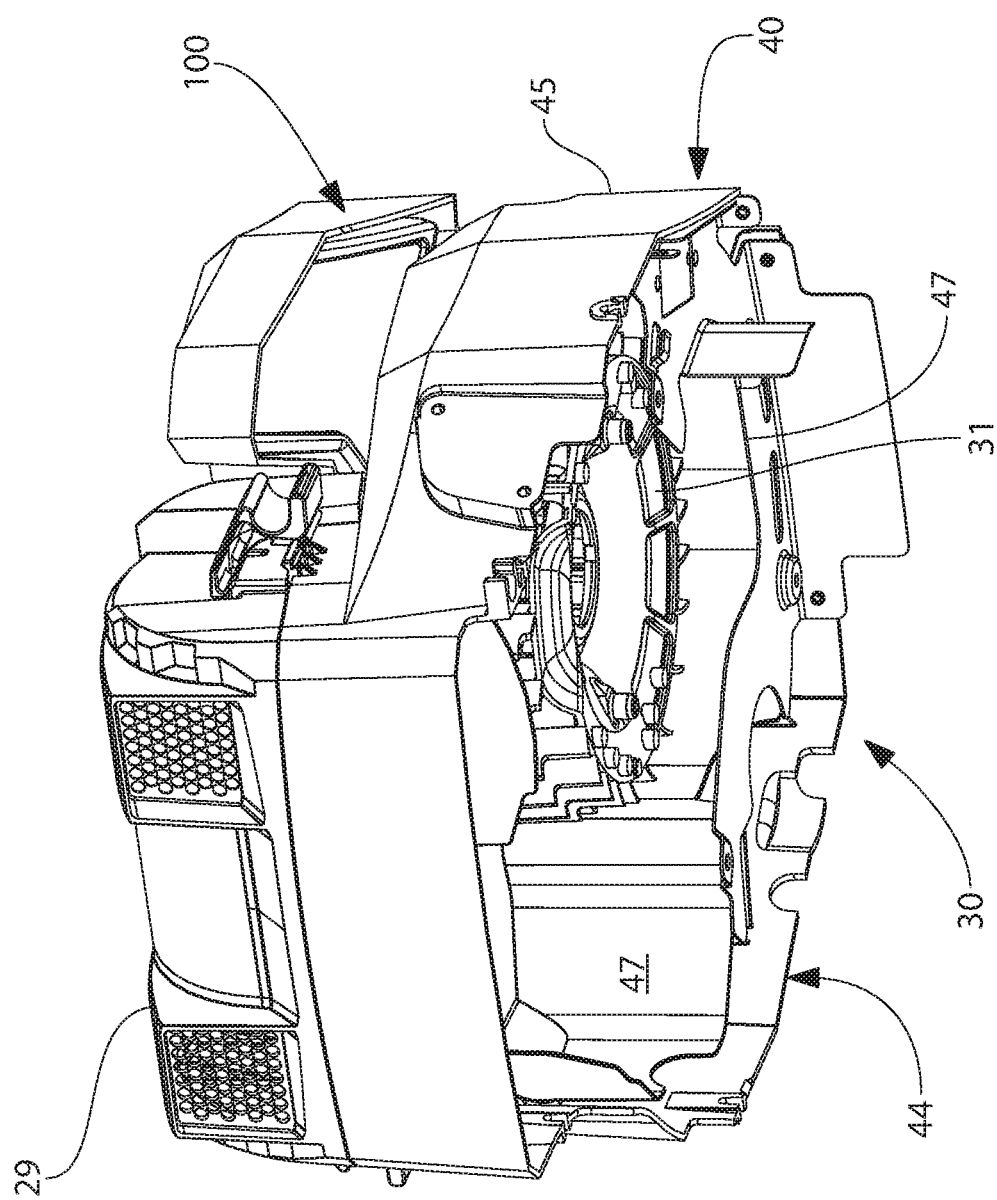
FIG. 3 is bottom front perspective thereof.
Figure 4A:
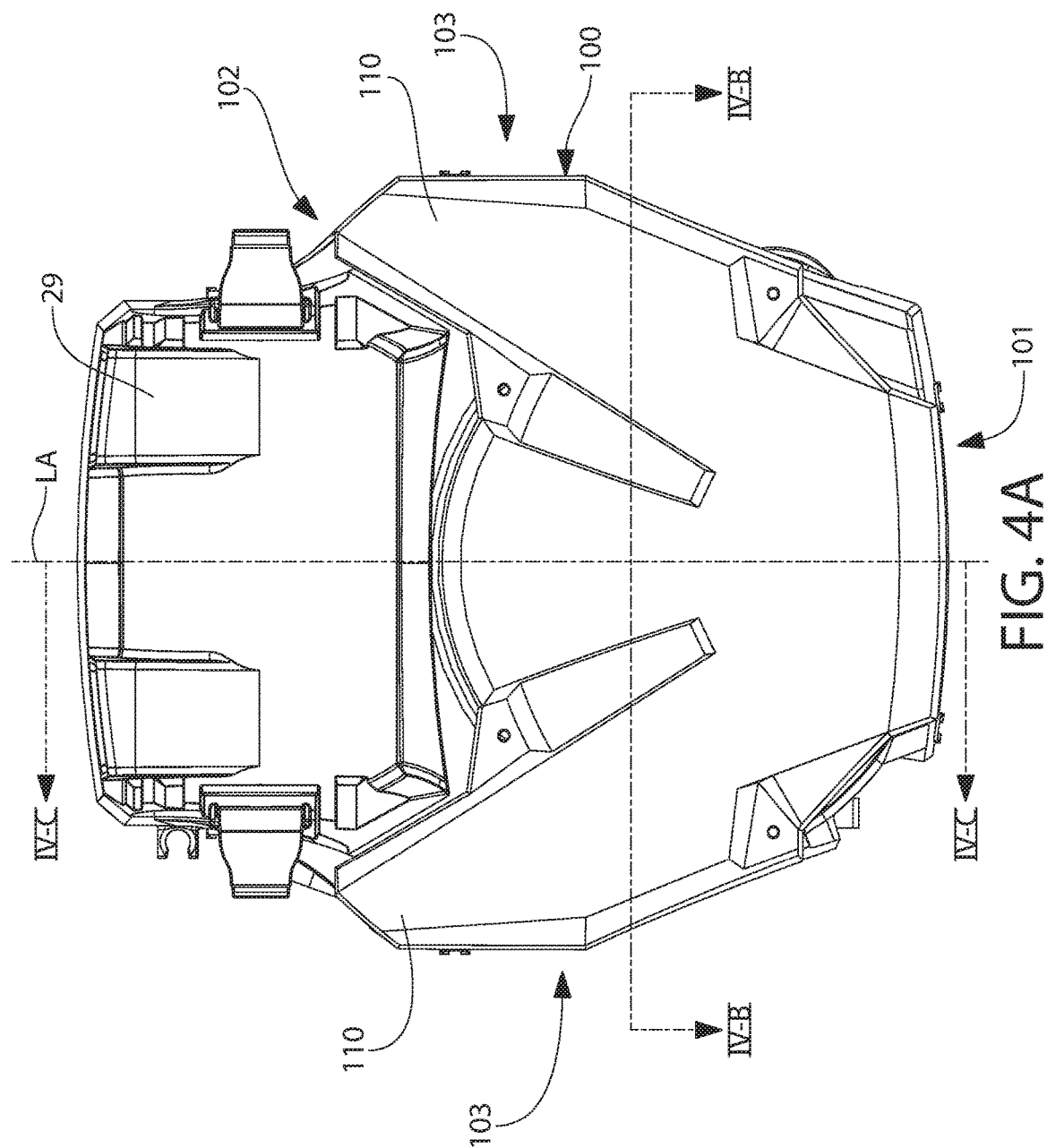
FIG. 4A is top plan view thereof.
Figure 4B:
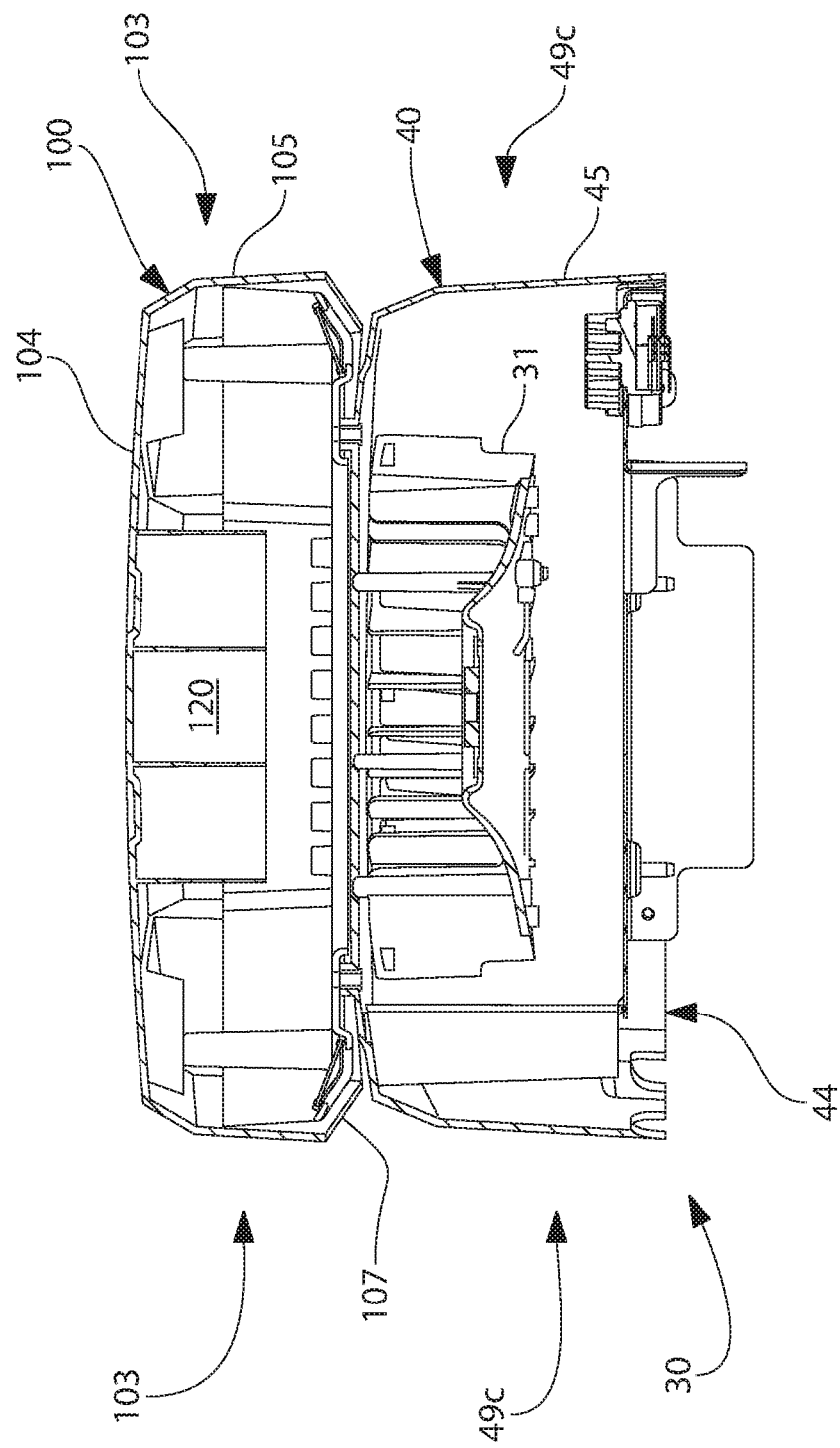
FIG. 4B is a transverse front cross-sectional view thereof.
Figure 4C:
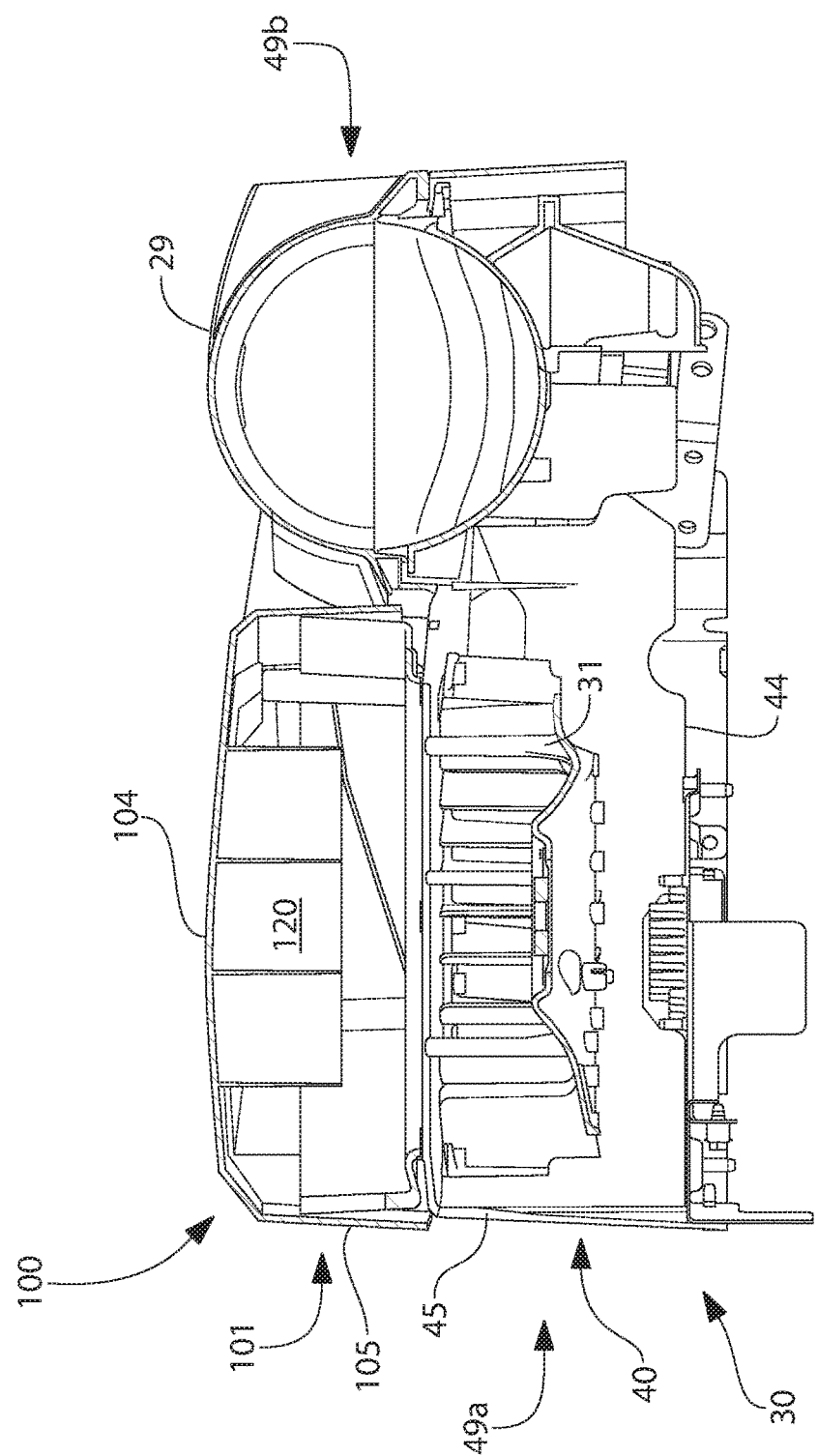
FIG. 4C is a longitudinal side elevation cross-sectional view thereof.
Figure 5:
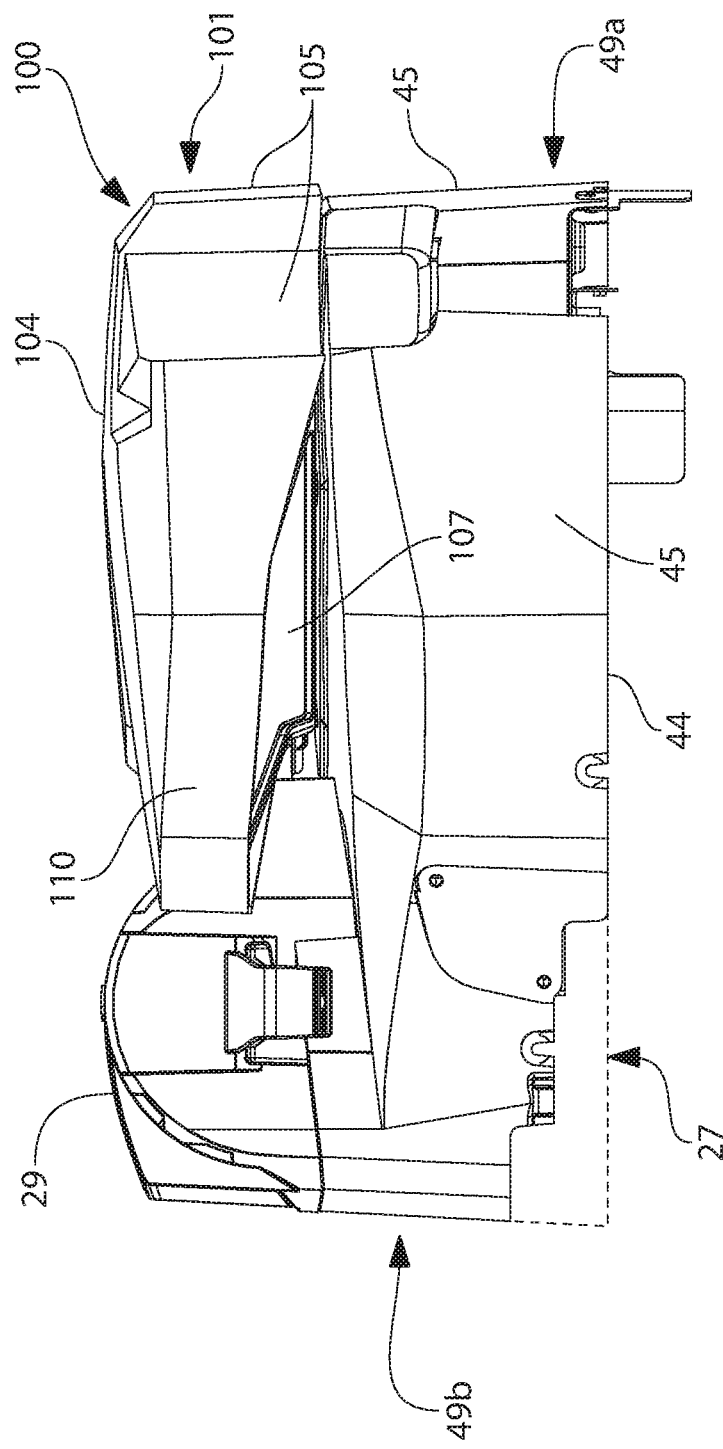
FIG. 5 is side elevation view thereof.
Figure 6:
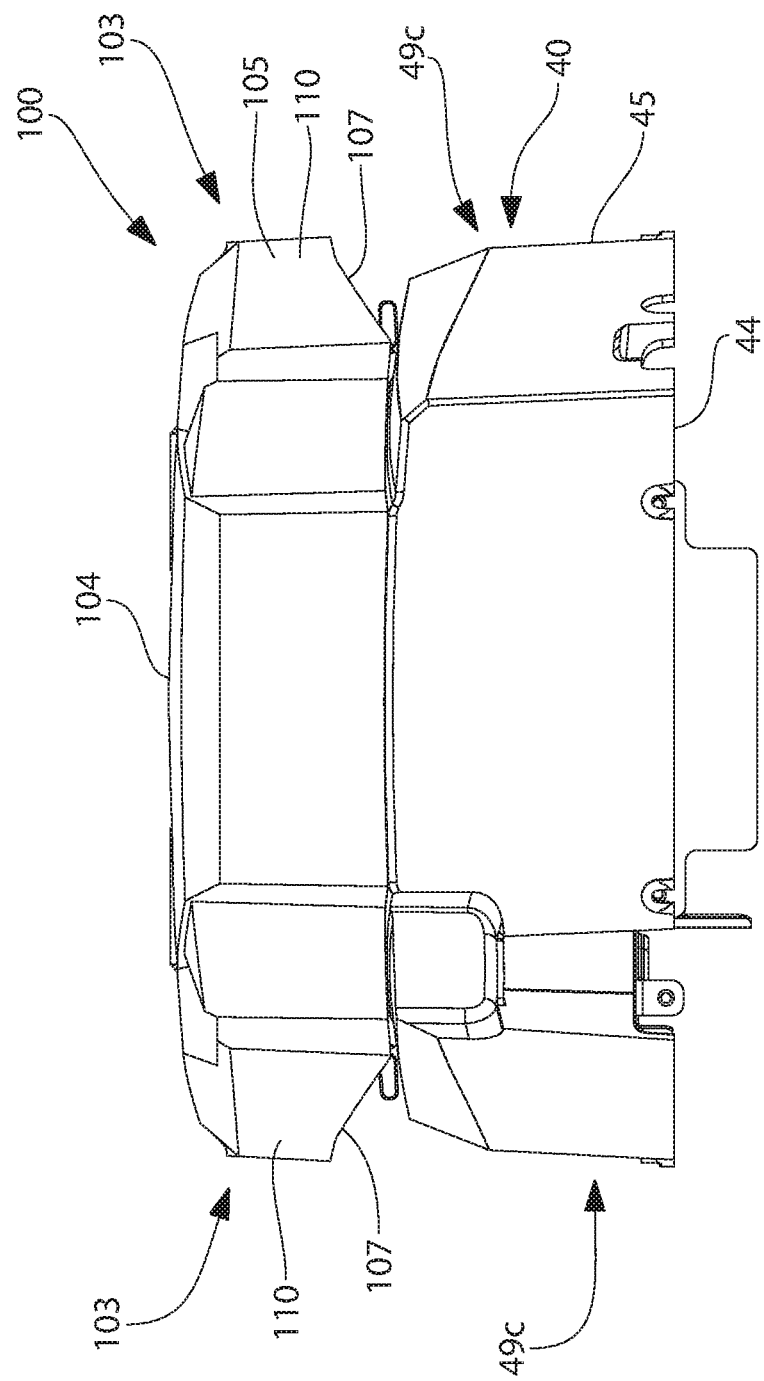
FIG. 6 is front elevation view thereof.
Figure 7:
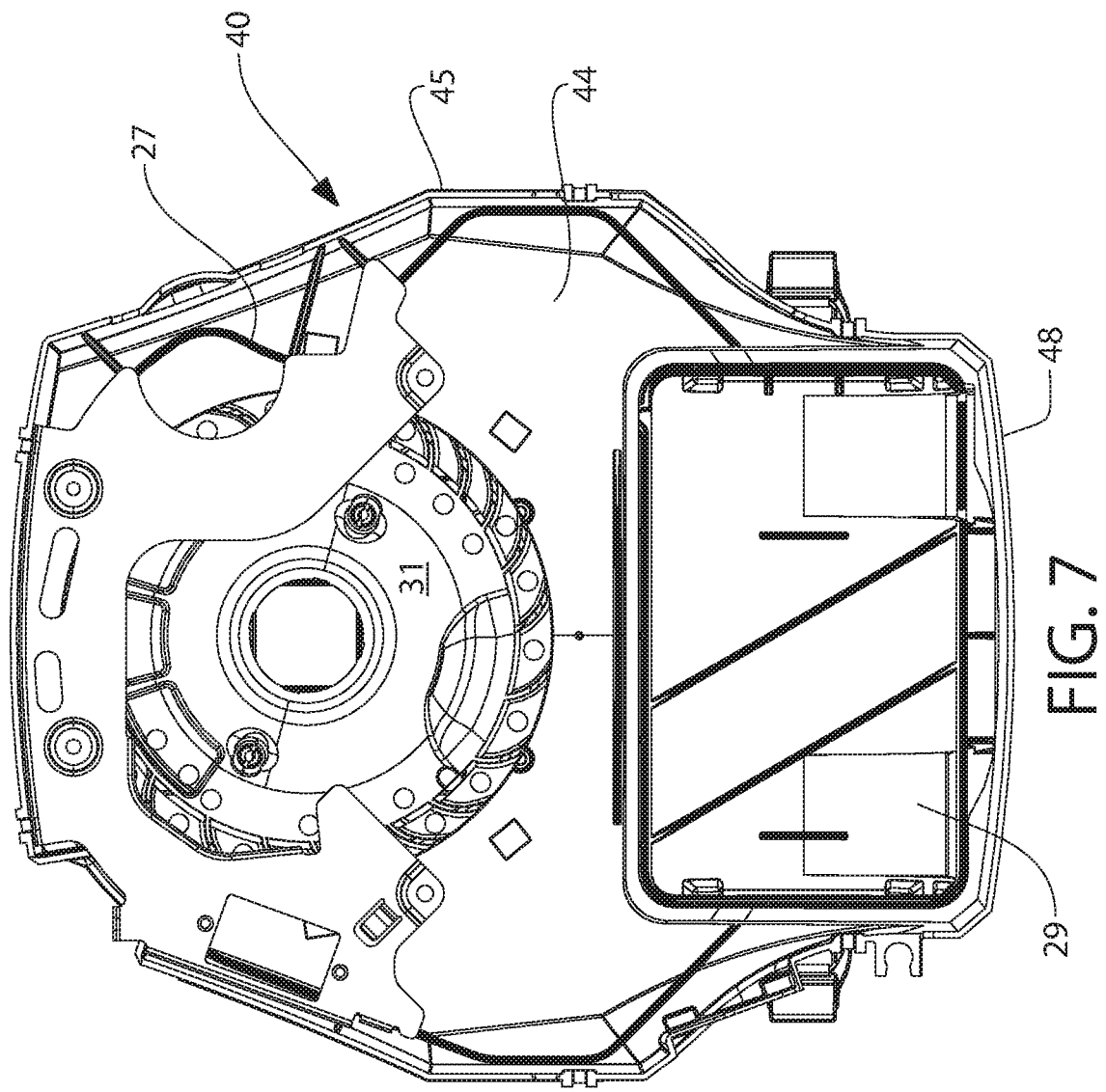
FIG. 7 is a bottom plan view thereof.
Figure 8:
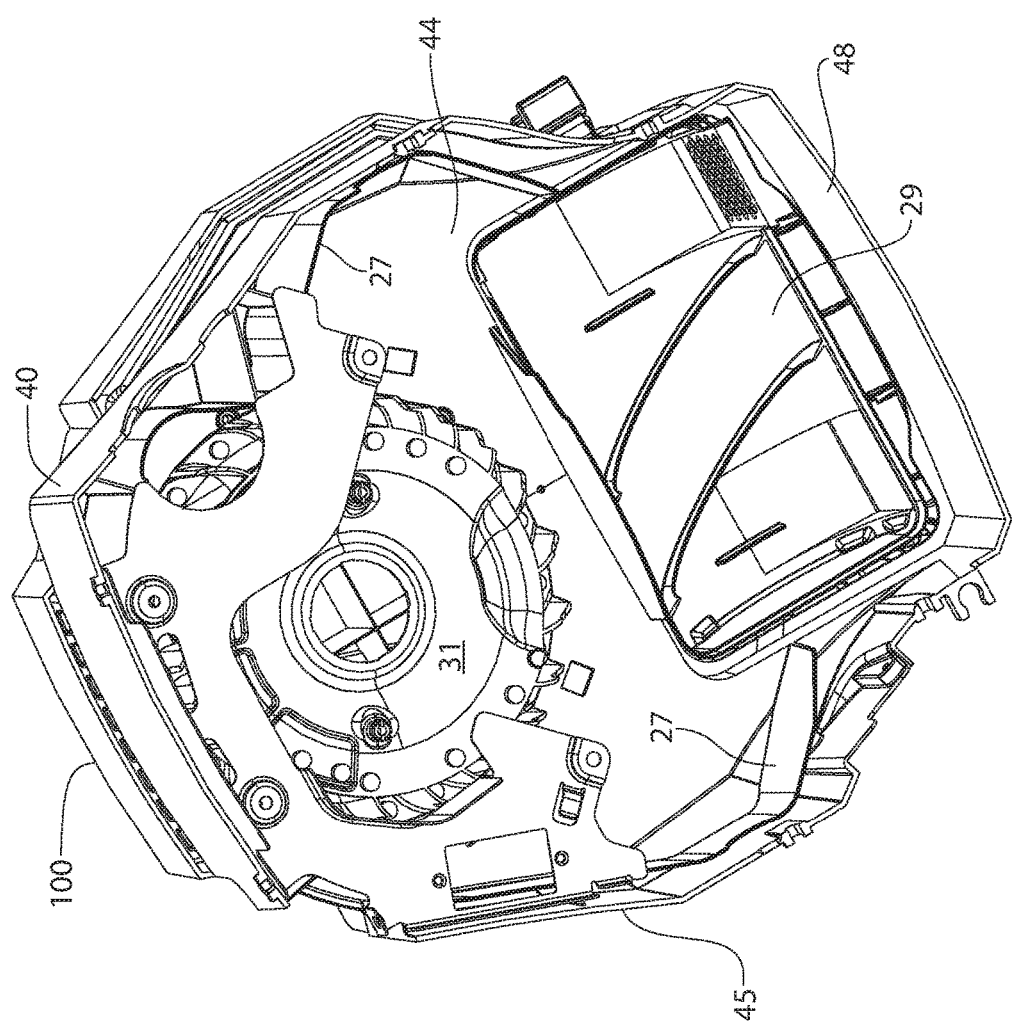
FIG. 8 is a bottom perspective view thereof.

FIGS. 1A and 1B show an exemplary piece of power equipment which may include a noise suppression system according to the present disclosure. In this non-limiting example, the power equipment may be a riding mower 20 comprised of a frame 21 with mowing deck 22, a seat 23 for an operator OP, wheels 25, and an engine 26 which provides the motive force to propel the mower along a surface and operate a rotating mowing blade (not shown) housed in the mowing deck. In this type of power equipment, the operator 25 may be positioned forward of the engine. The engine 26 may be any type of internal combustion engine operated on gasoline, diesel, or another suitable liquid or gaseous fuel source. While the engine 26 is shown in one orientation with inlet passages 110 directed away from an operator OP, in other systems, the engine 26 may be rotated about a vertical axis such that the inlet passages 110 may be positioned in other ways. Additionally or alternatively, in other systems, the engine 26 may be used with various other power equipment or systems, such as walk-behind lawn mowers, generators, pressure washers, or air compressors.

Referring to FIGS. 2-8, the engine 26 may be an air cooled engine including a fan (or blower) 30 and blower housing 40. The fan 30 and/or blower housing 40 may be mounted with (such as on top of) the engine (not shown in these figures for clarity). These figures show the fan 30, associated appurtenances, and a noise suppression shroud 100 to be further described herein.

The fan 30 may include, or be housed within, a blower housing 40. The blower housing 40 may be configured and dimensioned to receive and support a rotatable impeller 31 of the fan 30 comprised of a plurality of blades 32 which operates to draw in ambient air and distribute the cooling air flow over the engine 26. The housing 40 may define a longitudinal axis LA, front 49a, rear 49b, sides 49c, and an interior space 41 configured to house impeller 31 and may include portions sized at least slightly larger than the outside diameter of impeller 31 in the horizontal/lateral direction to define an airflow path, which will become apparent upon further description herein. The impeller 31 may rotate inside the housing 40 and be powered by a mechanical coupling to the drive shaft of engine 26. The blower housing 40 may be mounted directly onto the top of the engine 26 such as with threaded fasteners or another suitable coupling system. An air cleaner unit 29 may be provided which in some units may be positioned to the rear of the blower housing 40.

Any suitable type of fan impeller 31 may be provided. FIGS. 31-34 shows fan impeller 31 in the configuration of a mono-pitch design having blades 32 which are equally spaced around the circumference of the impeller. Fan impeller 31 with equally spaced blades 32 may generate or otherwise create fan noise that is concentrated over a small band of frequencies. FIGS. 35-38 shows an alternative embodiment of a fan impeller 33 in the configuration of a modulated design having blades 32 which are unequally spaced around the circumference of the impeller and have different sinusoidal modulations in the blade spacing. One impeller 33 design may have three different sinusoidal modulations in the blade spacing. Fan impeller 33 with blades 32 of different spacings may generate or otherwise create fan noise that is less concentrated than the mono-pitched fan impeller 31, but over a wider band of frequencies. Other impellers may have more or less sinusoidal modulations in blade spacing or non-sinusoidal modulations in blade spacing.

Fan impellers 31 and 33 may each include an annular or ring-shaped body having circumferentially extending lateral sides 34, a top 35, a mounting flange 38, and a bottom 36 which is positioned closest to engine 26 when the blower housing 40 is mounted thereon. Blades 32 may extend axially between the top and bottom 35, 36 at the periphery of the impellers 31, 33. The blades 32 may extend radially outwards from a hub 37 defining an axis of rotation. The lateral sides 34 may be substantially open as shown. In operation, cooling air may be drawn downwards through the top 35 of the impeller 31 or 33 and discharged radially outwards through lateral sides (outer diameter) 34 of the impellers by the blades 32 at least partially within the confines of the blower housing 40. A circumferentially extending gap 42 may be formed in interior space 41 of the blower housing 40 between impellers 31 or 33 and the inside of the housing which define an outlet air flow pathway for receiving cooling air from the fan 30, as further described herein.

Hereafter, reference will be made only to impeller 31 for convenience and brevity recognizing that impeller 33 may alternatively be used unless explicitly mentioned otherwise.

Figure 9:
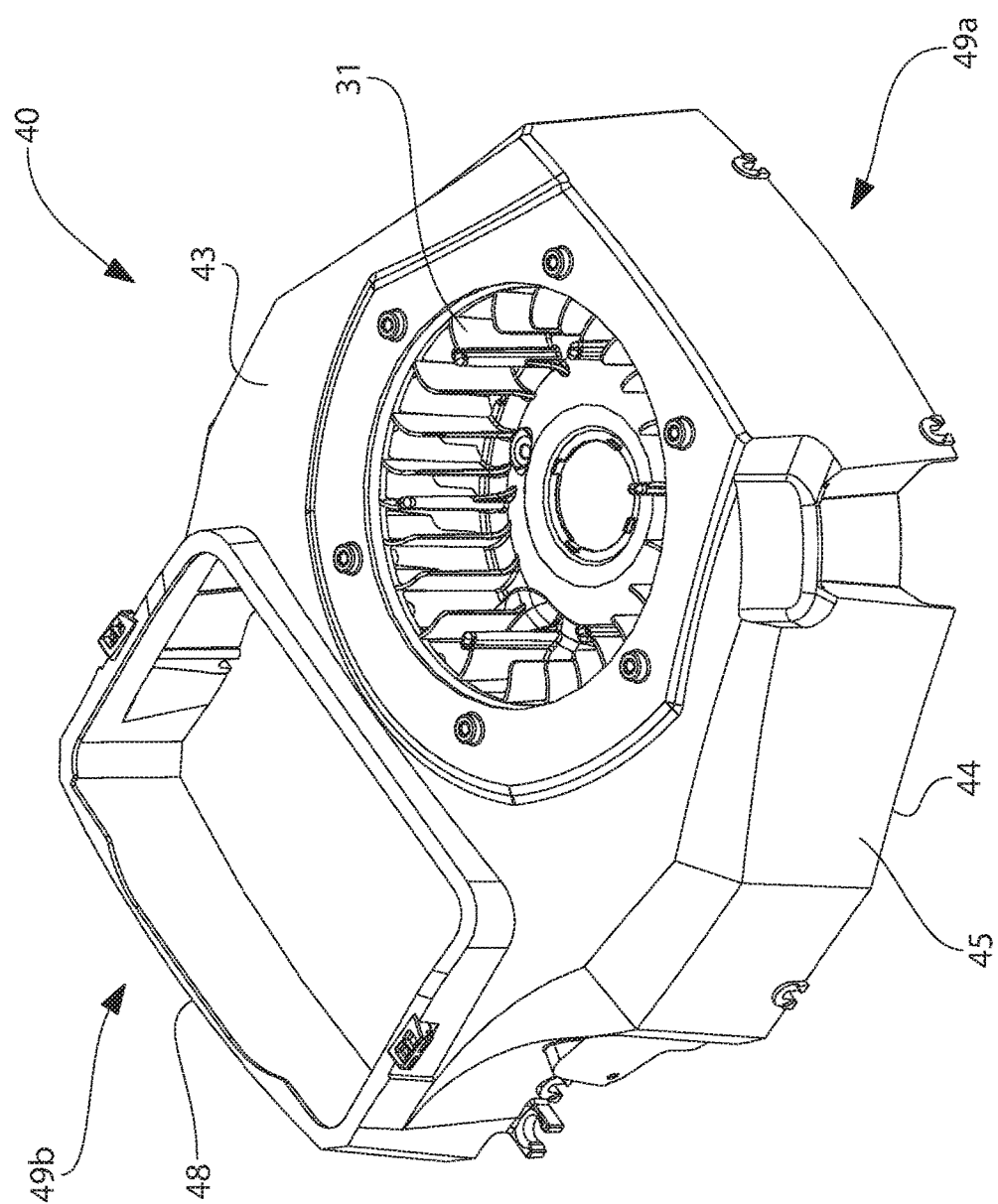
FIG. 9 is a top perspective view of the blower housing with shroud removed.
Figure 10:
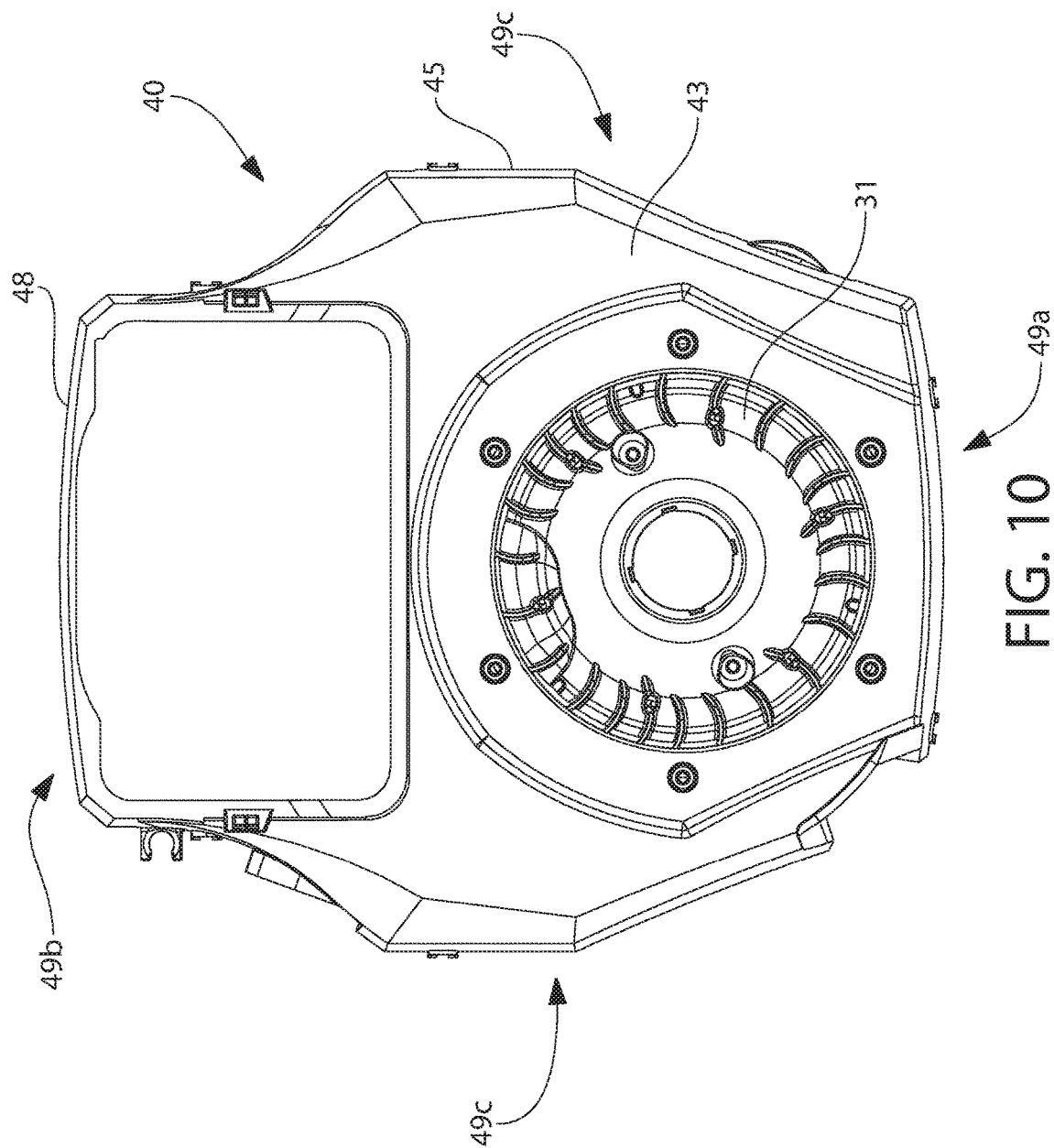
FIG. 10 is a top plan view thereof.
Figure 11:
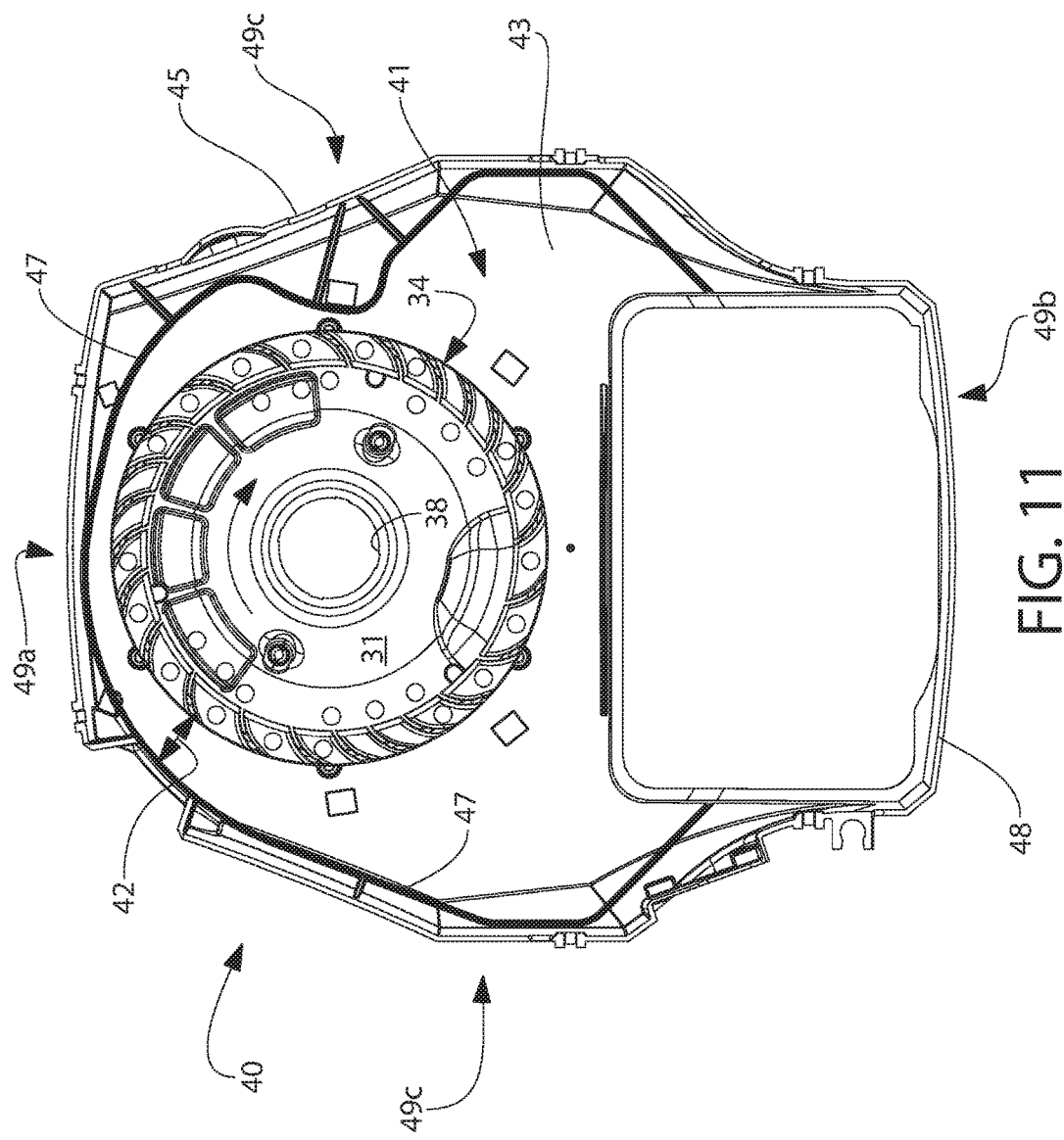
FIG. 11 is a bottom plan view thereof.
Figure 12:
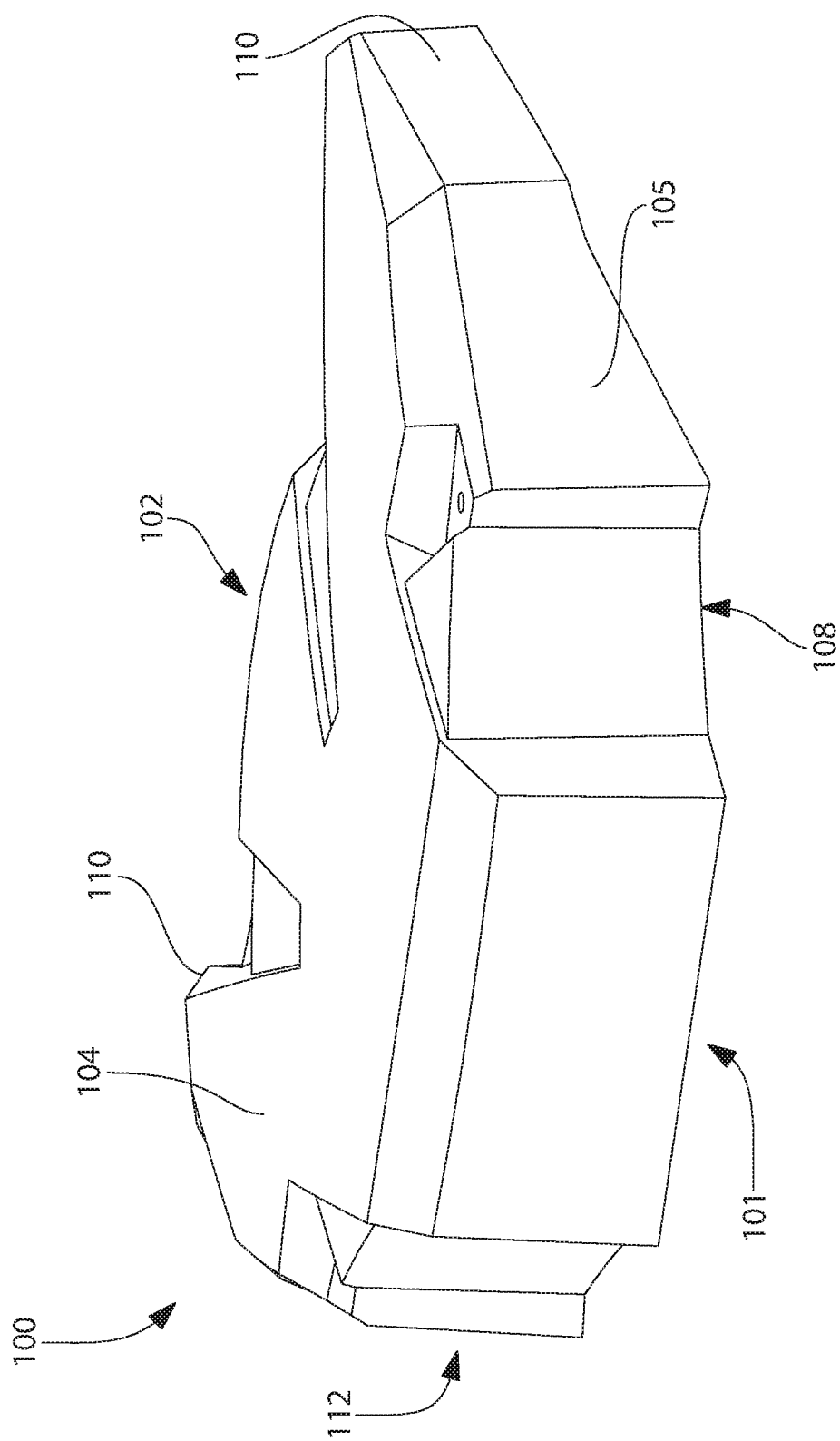
FIG. 12 is a front perspective view of the shroud.
Figure 13:
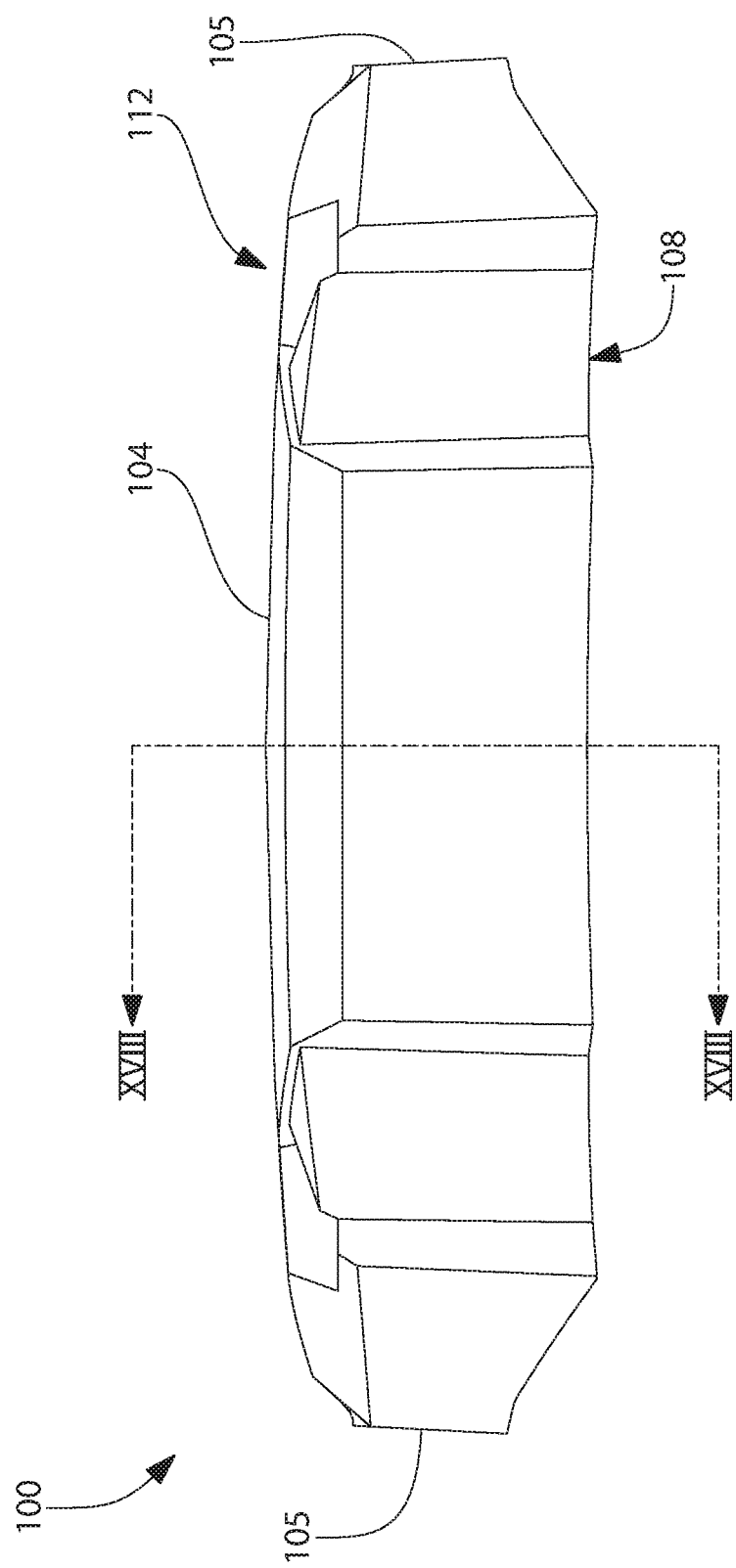
FIG. 13 is a front view thereof.

FIGS. 9-11 show the blower housing 40 and impeller 31 alone without noise suppression shroud 100.

Blower housing 40 further includes a top 43, at least partially open bottom 44, and peripheral sidewalls 45 extending vertically between the top and bottom which terminate at a bottom edge 46. Top 43 and sidewalls 45 define the interior space 41 in which impeller 31 is disposed. Some blower housings 40 may have a somewhat overall trapezoidal shape in top plan view to generally complement and conform to the shape of the engine 26. In the non-limiting example of the engine 26 described herein, the engine may be an air cooled vertical shaft, V-twin cylinder arrangement of any suitable horsepower (HP) for the intended application. Accordingly, the engine cylinders 27 may be disposed horizontally and at an angle to each other wherein the blower housing 40 may be provided with a substantially conforming configuration as shown.

In some blower housings 40, an open-centered air cleaner frame 48 may be provided at the rear of the housing which receives at least partially therein a portion of the air cleaner 29. The frame 48 may be configured to complement the shape of the air cleaner.

Blower housing 40 may further include an airflow scroll shield 47 disposed in interior space 41 of the housing. The scroll shield 47 assists with developing a desired air flow path within the blower housing from impeller 31 to optimize engine cooling. Scroll shield 47 is affixed to the blower housing and positioned between interior portions of the sidewalls 45 and impeller 31 depending on which impeller is used. Scroll shield 47 is spaced apart from the lateral sides 34 of the impeller in the lateral/horizontal direction. In one blower housing 40, scroll shield 47 extends circumferentially around the impeller 31 from the front portion of the impeller rearwards beyond the impeller. The scroll shield 47 may be configured in a horizontally undulating configuration being unequally spaced from the impeller to direct cooling air from the impeller rearwards and downward to the two cylinders 27 (shown schematically in dashed lines in FIG. 5) of the engine 26. The cooling air flows through cooling fins on each cylinder to dissipate heat generated by operation of the engine.

According to one aspect of the present disclosure, a noise suppression system is provided to attenuate sound produced by cooling fan 30, the associated cooling air system, and other engine noise propagating through the blower housing 40. The noise suppression system may include a noise suppression shroud 100 which is configured and operable to attenuate and reduce noise emissions from the fan and cooling system (and other engine components) during operation of engine 26, as further described herein. While the description may refer to attenuating, damping, and reducing noise emissions from the fan 30 and cooling system, it should be recognized that the noise suppressions shroud 100 also operates to attenuate, damp, or reduce various other noise emissions (such as engine noise emissions) that exist or propagate through the blower housing 40 or the noise suppression shroud 100.

FIGS. 12-30 show shroud 100 and various appurtenances, as further described herein.

Shroud 100 may have a three-dimensional shell-shaped body and generally include a front 101, rear 102, and opposing lateral sides 103. Shroud 100 may be removably mounted on top of blower housing 40 by any suitable method or combinations of methods including without limitation fasteners, snap fit, frictional fit, adhesives, welding, brazing, etc. The shroud 100 may have a complementary shape which generally conforms to the shape of housing 40. Shroud 100 may further include a top wall 104 and sidewalls 105 on the front 101, rear 102, and sides 103 extending downwards from the top wall. The sidewalls 105 may be generally vertical or may have different shapes, positions, or dimensions. The bottom edges of sidewalls 105 may define an open bottom 108 of the shroud 100 and corresponding downwardly open internal cavity 106 designed for noise suppression, and for holding additional noise suppression features and to define a cooling air inflow path to the fan 30, as further described herein.

The top wall 104 of the shroud 100 may, in some systems, be generally horizontal. In other systems, the top wall 104 may be slightly curved, domed or convex shaped to varying degrees, as shown by the dashed top wall 104' in FIG. 18. In some configurations, this slightly rounded side profile of the top wall may provide better acoustic sound attenuation performance that a flat top wall 104.

The dome-shaped shroud 100 and top wall 104, as well as the cavity 106 that it forms, provide noise attenuation. Due to the construction and configuration of the top wall 104, acoustic cancellation occurs as sound/noise waves reflect from surfaces and are re-directed back towards matching waves. Sound waves in opposite directions with equal or close frequencies will tend to cancel each other (attenuation). Accordingly, a domed or slightly curved top wall 104 may be useful in providing noise reduction for the system. The domed or slightly curved top wall 104 may additionally provide increased structural support and integrity to the top of the shroud 100, which may increase durability of the shroud 100.

The body of the shroud 100 may be a two-piece unit comprised of a lower portion such as mounting base 113 configured for attachment onto air blower housing 40 and an upper portion such as cover 112 configured for attenuating sound. Mounting base 113 may be attached to blower housing 40 by any suitable method or combinations of methods including without limitation fasteners, snap fit, frictional fit, adhesives, welding, brazing, etc. Cover 112, in turn, may be removably attached to mounting base 113 by the same foregoing methods or others. The cover 112 may be configured and dimensioned in some shrouds to be at least partially insertable into the mounting base 113. Mounting base 113 may be vertically shorter in height than at least some portions of the cover 112. Mounting base 113 includes a perimeter frame 115 which may have an overall shape in top plan view which substantially conforms with the corresponding shape of the cover 112 of shroud 100.

Figure 21:
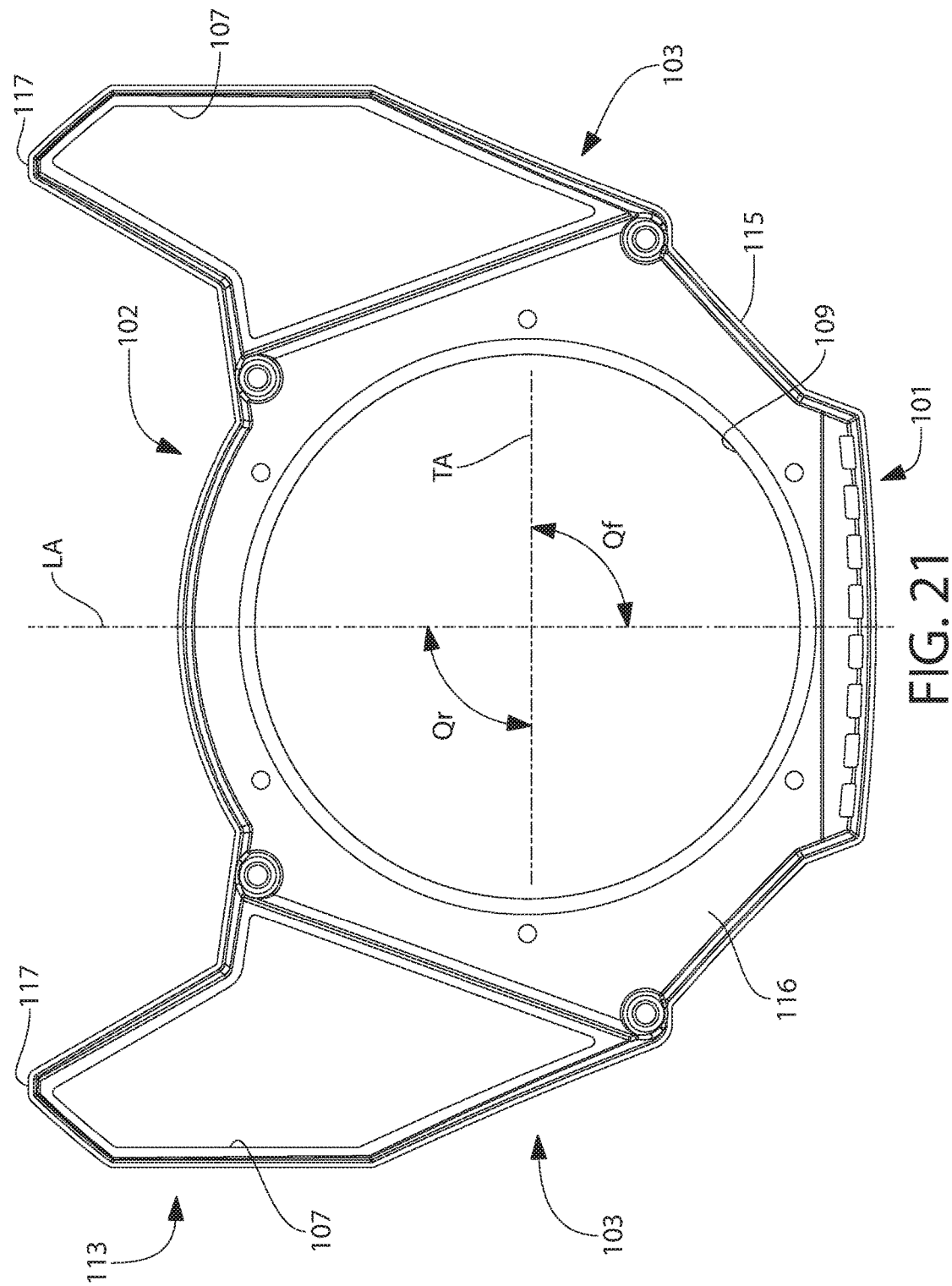
FIG. 21 is a top plan view thereof.
Figure 22:
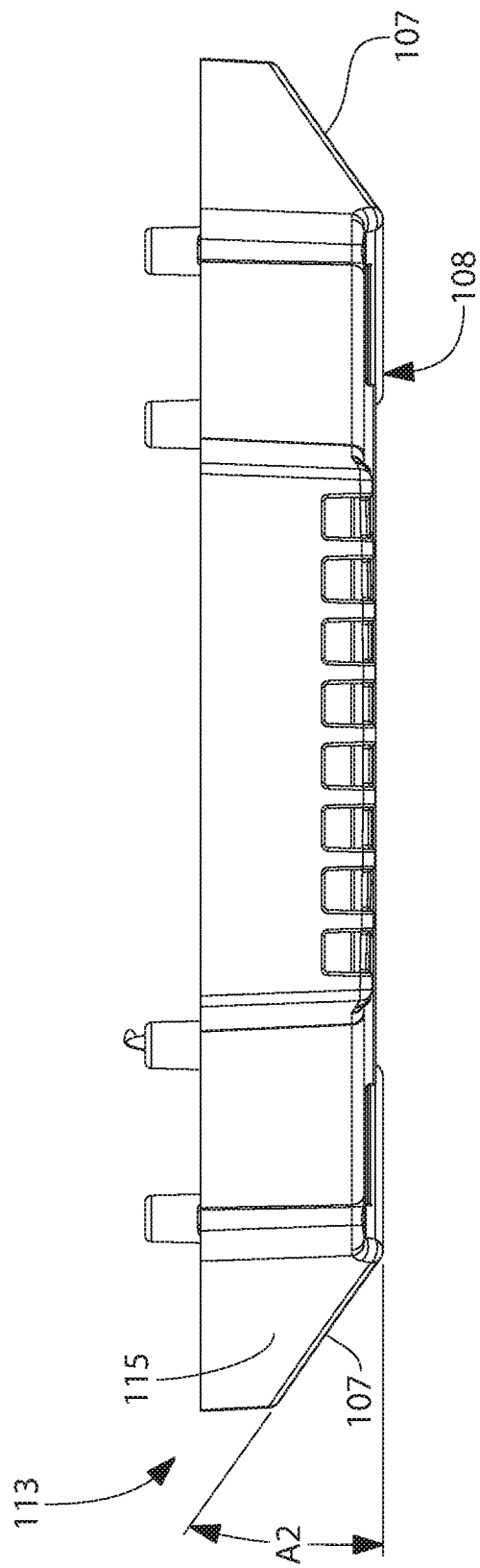
FIG. 22 is a front elevation view thereof.
Figure 23:
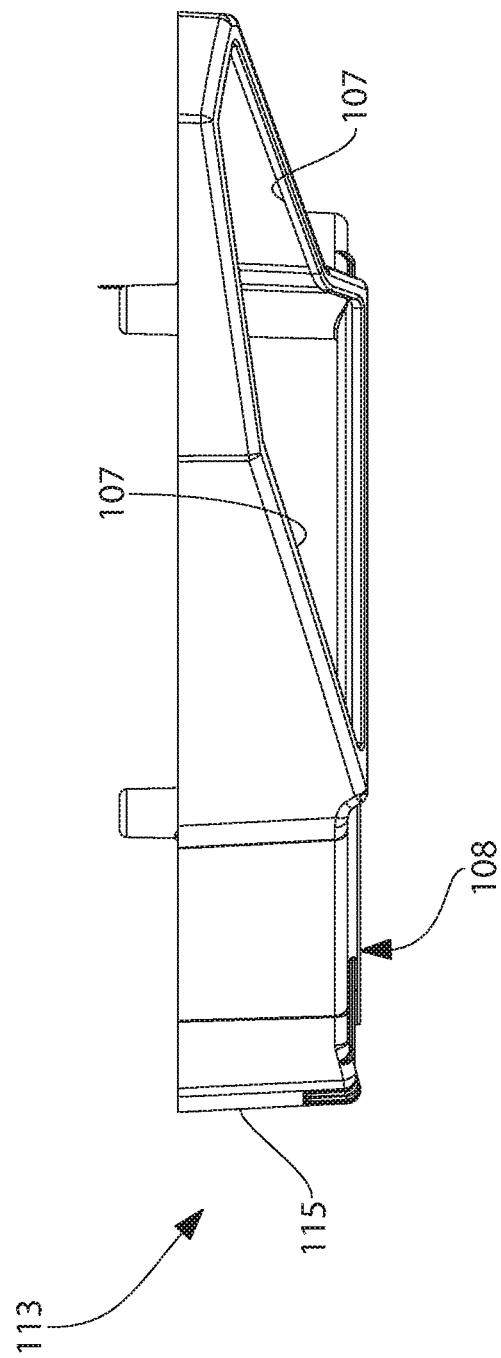
FIG. 23 is a side elevation view thereof.
Figure 24:
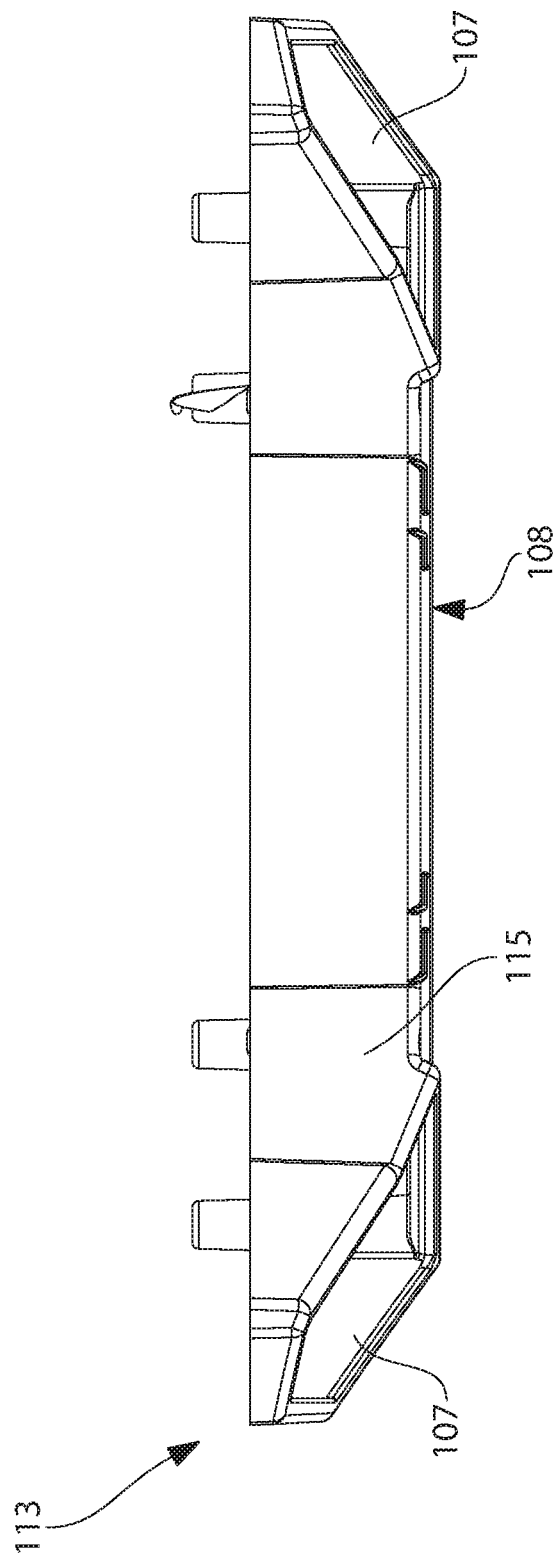
FIG. 24 is a rear elevation view thereof.
Figure 25:
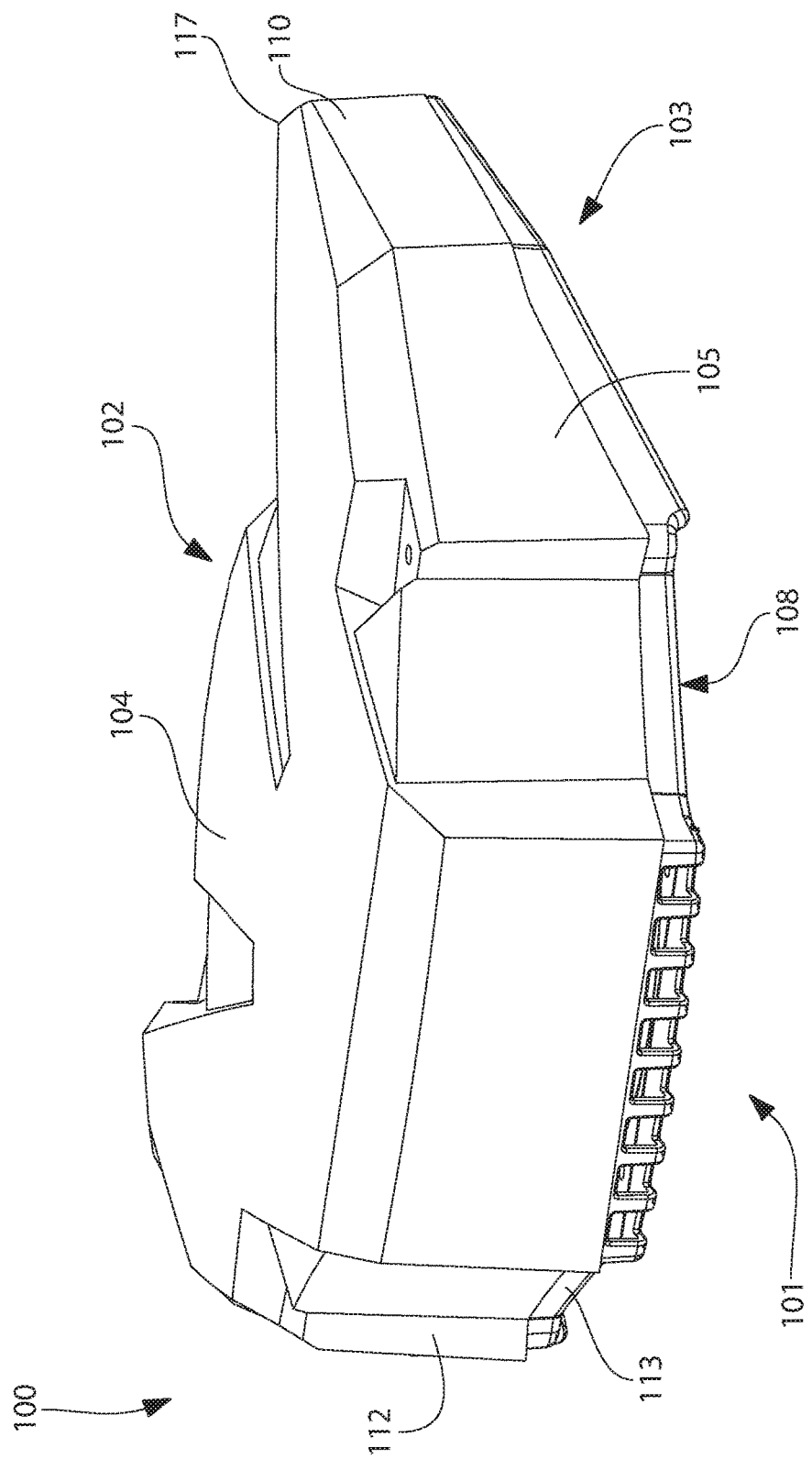
FIG. 25 is a front perspective view of the shroud base and cover assembly.

The bottom 108 of shroud 100 may include open areas and closed areas. Shroud 100 may therefore further include a horizontal partition wall 116. In two-piece constructions of the shroud 100 described above, the horizontal front wall 116 may be formed in lower mounting base 113. In some shrouds, partition wall 116 may define a generally circular shaped central aperture 109 (in top plan view) which is configured and dimensioned to be concentrically aligned with a rotational axis of fan impeller 31 when the shroud 100 is mounted on the blower housing 40. In some shrouds, central aperture 109 may have a diameter which is at least the same or larger than a diameter or outer side 34 of the impeller 31 so as to not impede inlet cooling air flow into impeller 31. The circular aperture 109 with its center positioned at the intersection of the longitudinal axis LA and a transverse axis TA as shown in FIG. 21 may be considered to define two front quadrants Qf and two rear quadrants Qr of the shroud 100 for convenience of reference in describing additional features of the shroud hereafter.

Shroud 100 may further include at least two enlarged and horizontally elongated air inlet passages 110 and associated air inlet ports 107. The air inlet passages 110 are configured and operable to attenuate fan noise. In addition to sound attenuation, the air inlet passages 110 and ports 107 are further operable via rotation of the fan impeller 31 to draw outside ambient cooling air underneath the shroud and inwards towards the impeller 31.

Air inlet passages 110 and ports 107 collectively define corresponding horizontally elongated openings which may be formed from rear portions of the shroud peripheral sidewalls 105, adjoining closed top wall 104, and the downwardly open bottom 108 of the shroud 100. The air inlet passages 110 may have a generally inverted U-shape in cross-section taken transversely to the inlet air flow path.

The peripheral sidewalls 105 of the shroud 100 may define a plurality of angled interior surfaces 105a which are acoustically configured, designed, and placed to induce internal reflection and capture of noise produced by the fan 30. The interior surfaces 105a within the air inlet passages 110 may form adjoining multi-faceted angled surfaces intended to reduce the amount of noise which escapes through the air inlet ports 107. In one shroud, the angled interior surfaces 105 of the shroud 100 are designed to direct a majority of the sound waves generated by the fan impeller 131 back towards the center of the shroud.

In one configuration of the shroud 100, a majority portion of each air inlet passage 110 may be positioned primarily in one of the two opposing rear quadrants Qr of the shroud (e.g. rear of the transverse axis TA) proximate to the rear 102 of the shroud body and adjoining rearward portions of sides 103 in each of these quadrants. The air inlet passages 110 may be located at these rear side portions of shroud 110 which correspond to low (or in some cases the lowest) sound pressure wave positions in comparison to other portions of the shroud, as determined by computer aided modeling. Accordingly, escaping noise levels from the cooling air system fan 30 from beneath the shroud 100 are at their lowest at the air inlet ports 107 in these rear quadrant positions.

As shown in FIGS. 19-24, air inlet ports 107 may be angled to face in a generally downwards and outwards direction towards the rear 102 of shroud 100 for radiating noise generated by fan 30 (or other engine components) rearwards away from the operator generally seated forward of the engine 26 in some outdoor riding equipment configurations (see, e.g. FIGS. 1A and 1B). The directional sound arrows in FIG. 1B show a general emission direction of the fan noise escaping the shroud through the air inlet ports 107 (radiated noise is very complete in this frequency range; these arrows are meant for general illustration purposes).

In some systems, one or more fins, dividers, or separating barriers may be placed within the air inlet ports 107, the air inlet passages 110, or both to serve multiple functions. For example, the fins may act to direct or guide the inlet air into the blower housing 40. The fins may guard the air inlet ports 107 from receiving grass or other debris into the housing 40. The fins may also or alternatively be constructed or engineered to force noise wave propagation in a certain direction out of the shroud 100. Other variations are possible.

Figure 15:
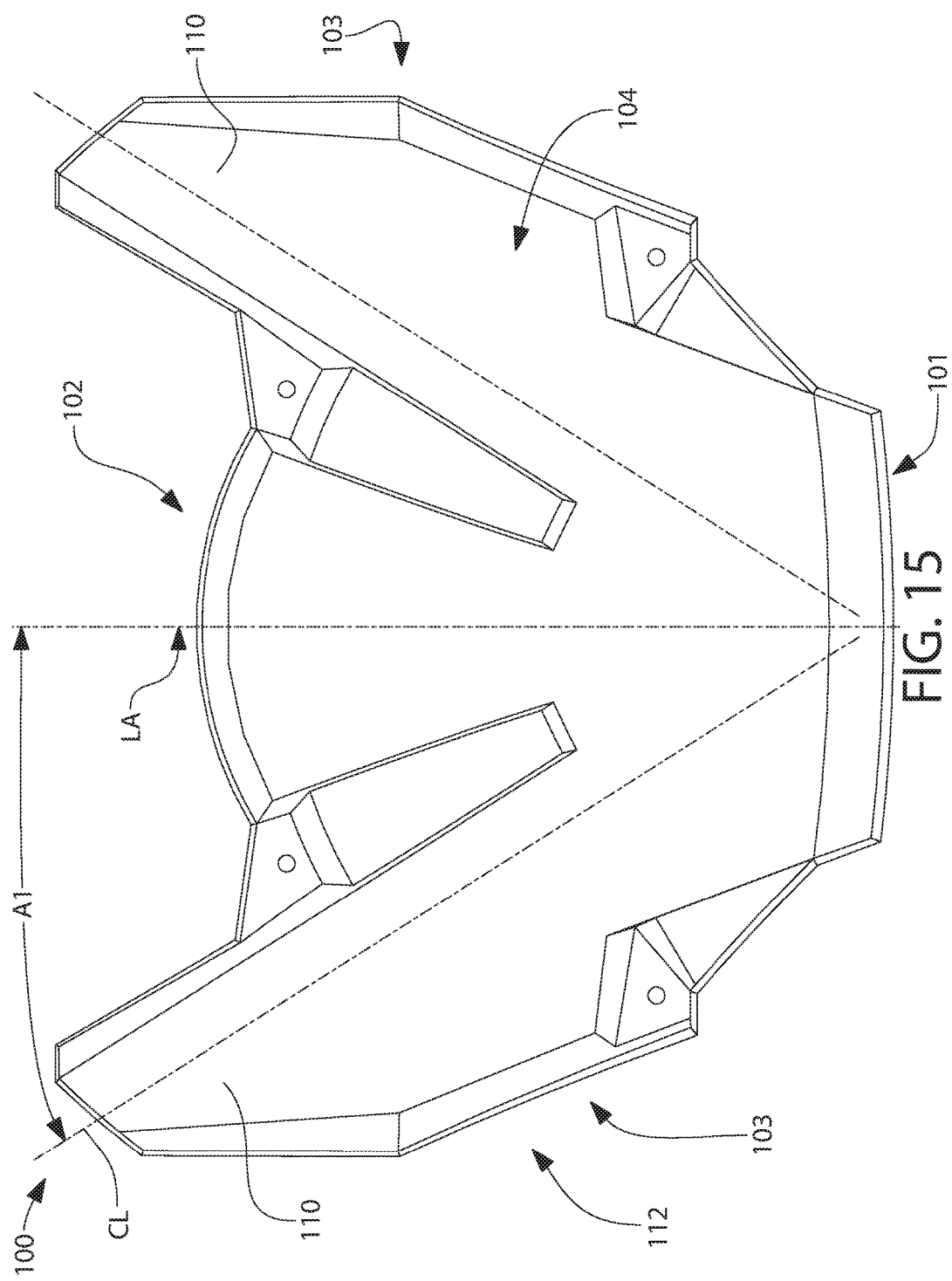
FIG. 15 is a top plan view of the shroud.
Figure 16:
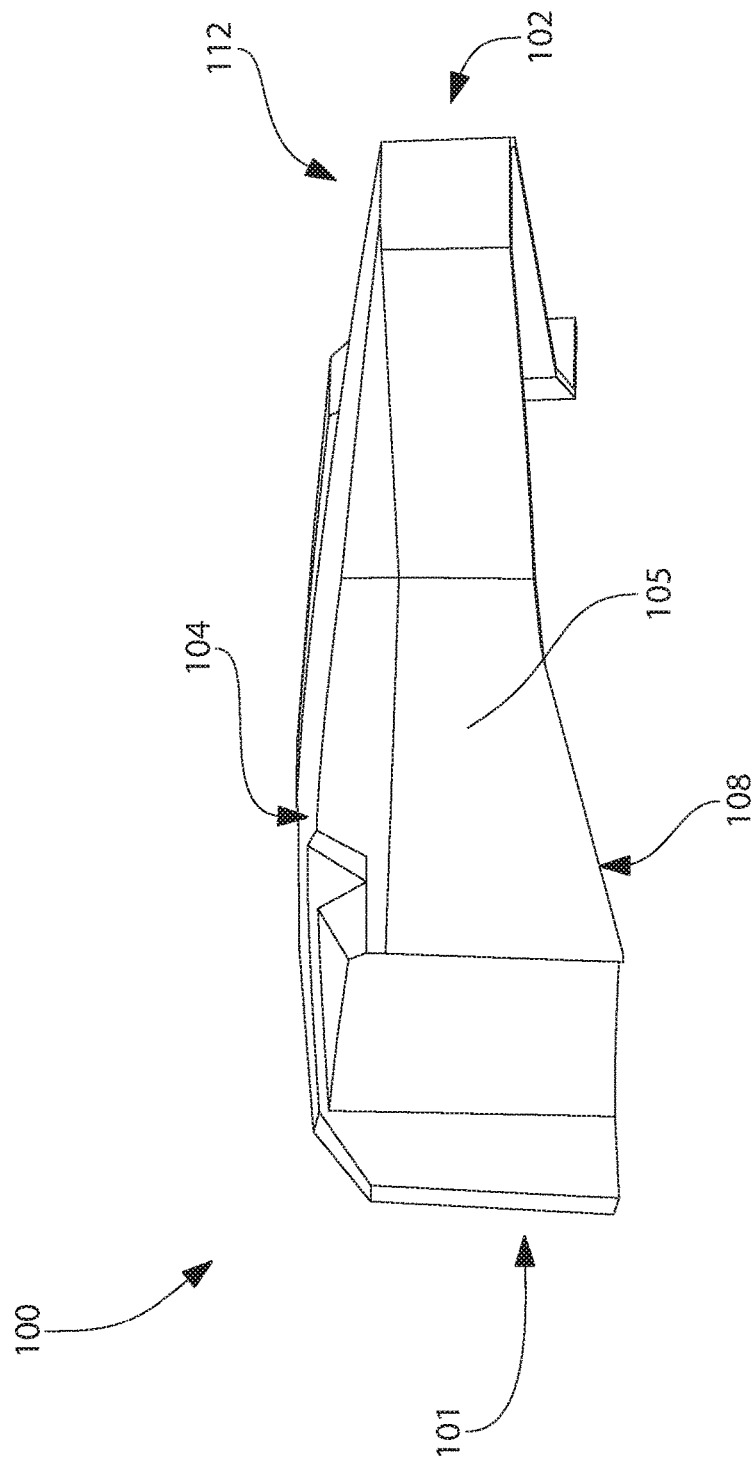
FIG. 16 is a side elevation thereof.

The air inlet passages 110 each may define a respective centerline CL extending along the greatest length of the passages from a common point of intersection (origin) proximate to the front 101 of shroud 100 to the rear of the passages as shown in FIG. 15. The air inlet passages 110 may be disposed at an angle A1 with respect to the longitudinal axis LA extending from front 101 to back 102 of shroud 100. In some shrouds, angle A1 may be without limitation between 0 and 90 degrees. Accordingly, the air inlet passages 110 may be angled and swept rearwards on shroud 100 having a somewhat wing-like configuration in top plan view. The air inlet passages 110 may be laterally spaced apart from each other by an angle equivalent to two times angle A1. The air inlet ports 107 associated with air inlet passages 110 may further be disposed at an angle A2 to the horizontal plane defined by the bottom 108 of the shroud 100 (see, e.g. FIG. 22) to direct fan noise not only downward but also outwards from the rear of the engine 26. In some shrouds, angle A2 may be without limitation between 0 and 90 degrees.

Air inlet passages 110 may be horizontally elongated from front to rear in the direction of the longitudinal axis LA and extend rearward by a distance farther a central rear portion of the rear 102 of the shroud closest to central aperture 109 than the terminal ends 117 of each as shown. The air inlet passages 110 are shaped to direct emitted fan noise from the fan 30 rearwards and generally downwards away from the operator's ears. In addition, the noise from the fan is directed by and within the air inlet passages 110 along the same pathway as the inlet cooling air drawn inwards towards the fan 30, but in the opposite direction to the incoming air. The drawing of intake air inwards in a direction opposite the direction of propagating sound waves may attenuate, damp, or otherwise reduce a level (or volume) of noise which is emitted through the air inlet ports 107.

It should further be noted that the placement and configuration of the horizontal partition wall 116 is intended to preclude cooling air intake into the shroud 100 and blower housing 40 at shroud locations which are more proximate to the operator (see, e.g. FIGS. 1A and 1B), and hence correspondingly which provide a possible directional pathway for fan noise to escape in the direction towards and reach the operator's ears. Accordingly, cooling air inflow into the shroud 100 may be restricted to each of the two air inlet ports 107 located at the distal rear end 102 of the shroud by partition wall 116 (see, e.g. FIGS. 19-24) rather than proximal portions of the shroud closer to the operator. Cooling system noise emissions may therefore be substantially restricted to the two rear quadrants Qr of shroud 100.

The foregoing partially enclosed configuration, elongated shape, and geometry of surfaces inside each air inlet passages 110 collectively helps induce internal reflection of the sound waves generated by fan 30 within each air inlet passages 110, thereby capturing a portion of the sound to reduce the overall noise level (e.g. measured in decibels or dBA) emitted from the air inlet passages that reaches the operator. The placement of the air inlet passages 110 in the two rear quadrants Qr of the shroud 100 most distal to an operator and directional angled positioning of the air inlet ports 107 described above substantially directs a significant amount of the fan noise escaping from the inlet air passages away from the operator positioned generally forward of the engine 26, as shown in FIGS. 1A and 1B. This reduces the overall cooling air system (and other engine component) sound level at the operator's ears. The placement of the air inlet passages 110 and associated air inlet ports 107 as described herein provides maximum attenuation of sound pressure waves in a direction away from the operator.

It will be appreciated that the shroud 100 could be located and positioned at various other locations with respect to or covering the entrance of a cooling system for the engine. Accordingly, the shroud is not limited to the placement and orientation shown and described herein by way of the non-limiting examples presented.

In other possible configurations of shroud 100, it will be appreciated that the shroud body may one-piece of unitary construction with an integral cover 112 and mounting base 113 which is attachable to the blower housing 40.

In some variations of the shroud, noise insulating material such as sound damping fibrous material may be applied inside cavity 106 of shroud 100 to increase overall noise reduction performance of shroud 100. The sound damping fibrous material may, for example, be a fiberglass absorptive material, a foam material such as melamine, damping felt, or various other materials. The sound damping fibrous material may be applied to various areas within the cavity 106, such as on the underside of the top wall 104 and/or inside of vertical peripheral sidewalls 105. Other variations are possible.

According to another aspect of the present disclosure, the noise suppression shroud 100 may include one or more quarter wave resonator 120. Quarter wave resonators 120 may further reduce the level of noise emitted by the engine cooling air system to the ambient environment. Quarter wave resonators (QWR) may attenuate sound via acoustic wave cancellation, which in the present case may be noise frequencies generated by the fan 30 or other engine components.

Figure 14:
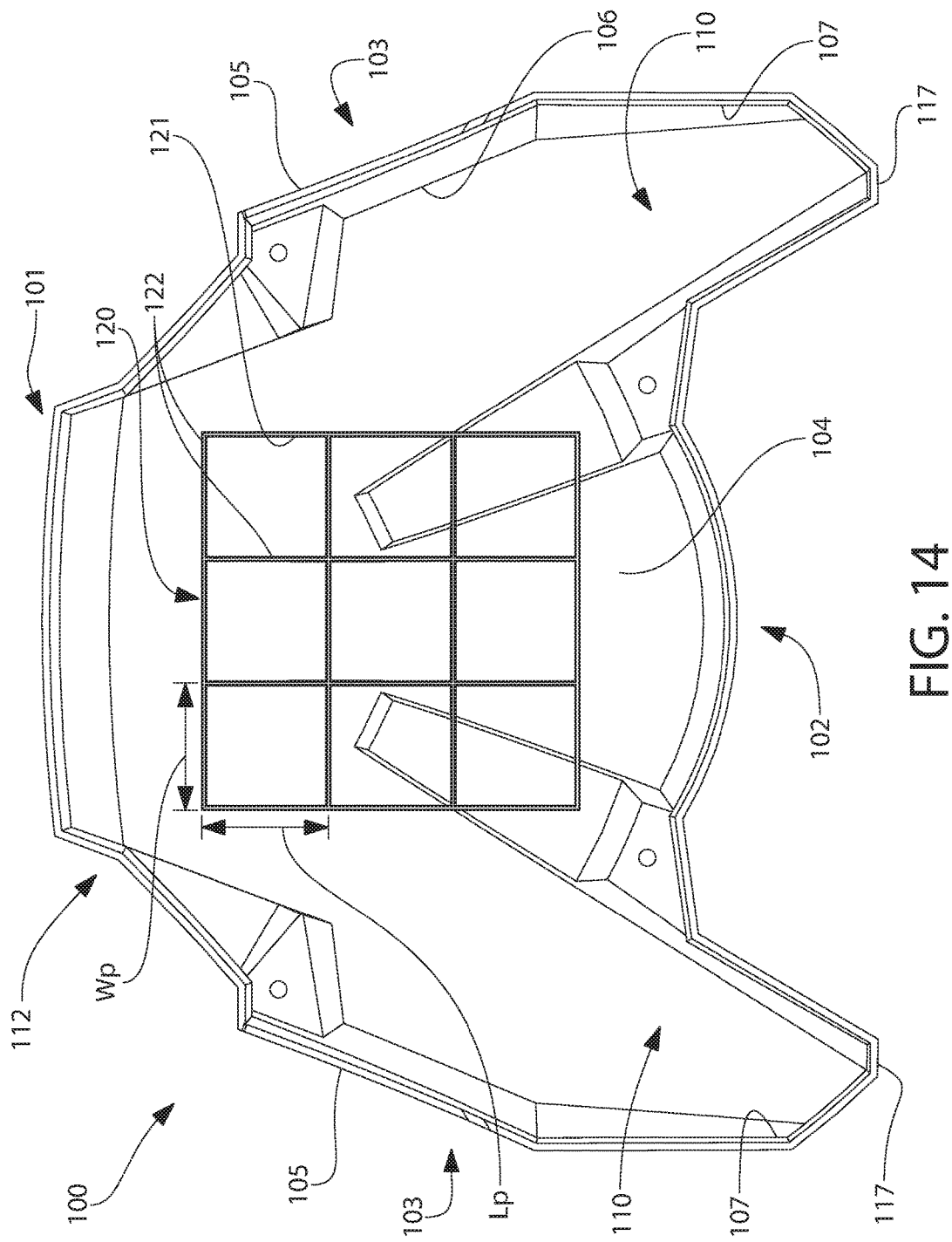
FIG. 14 is a bottom plan view thereof showing a quarter wave resonator inside the shroud.
Figure 17:
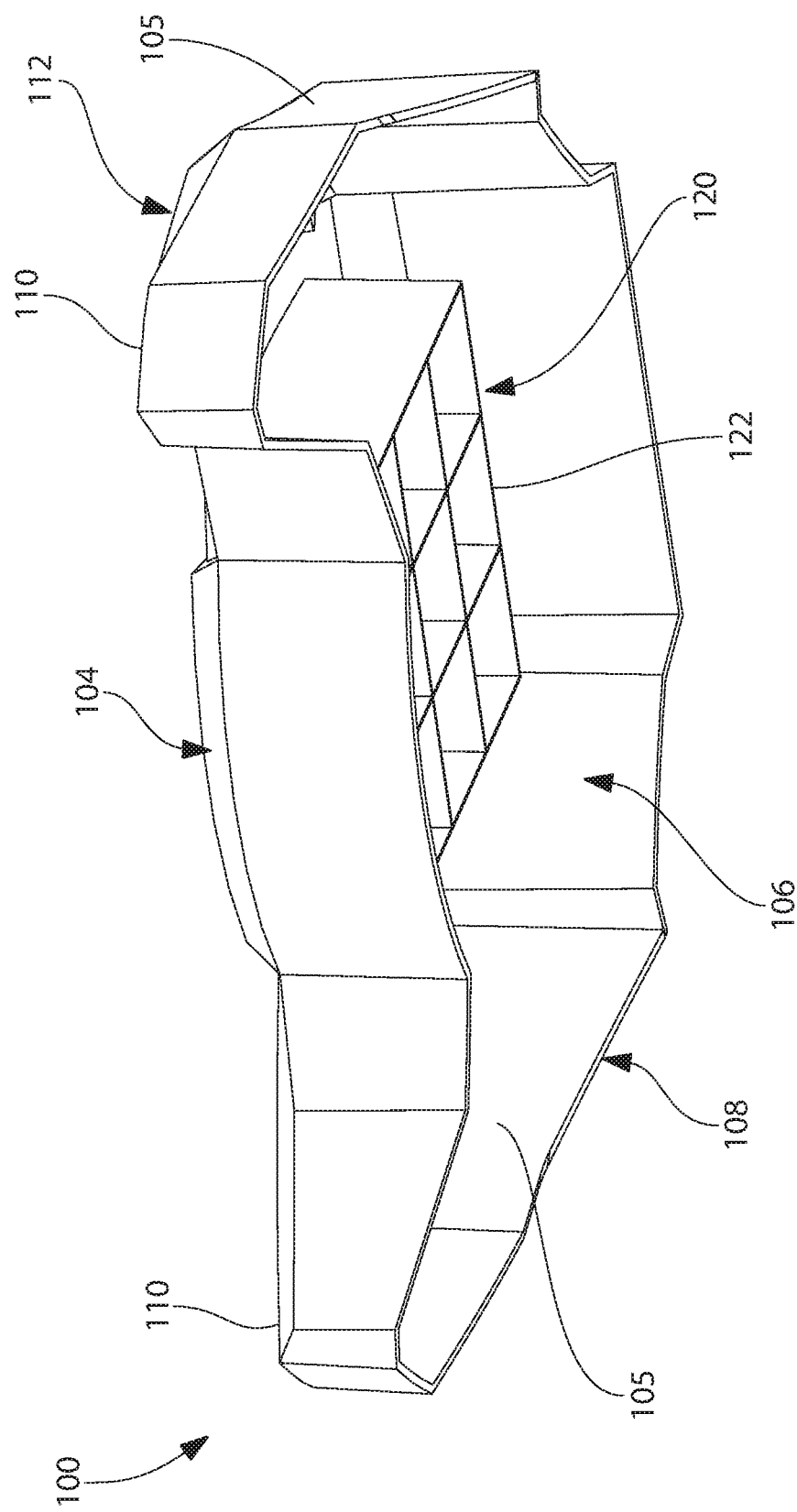
FIG. 17 is bottom rear perspective view thereof.
Figure 18:
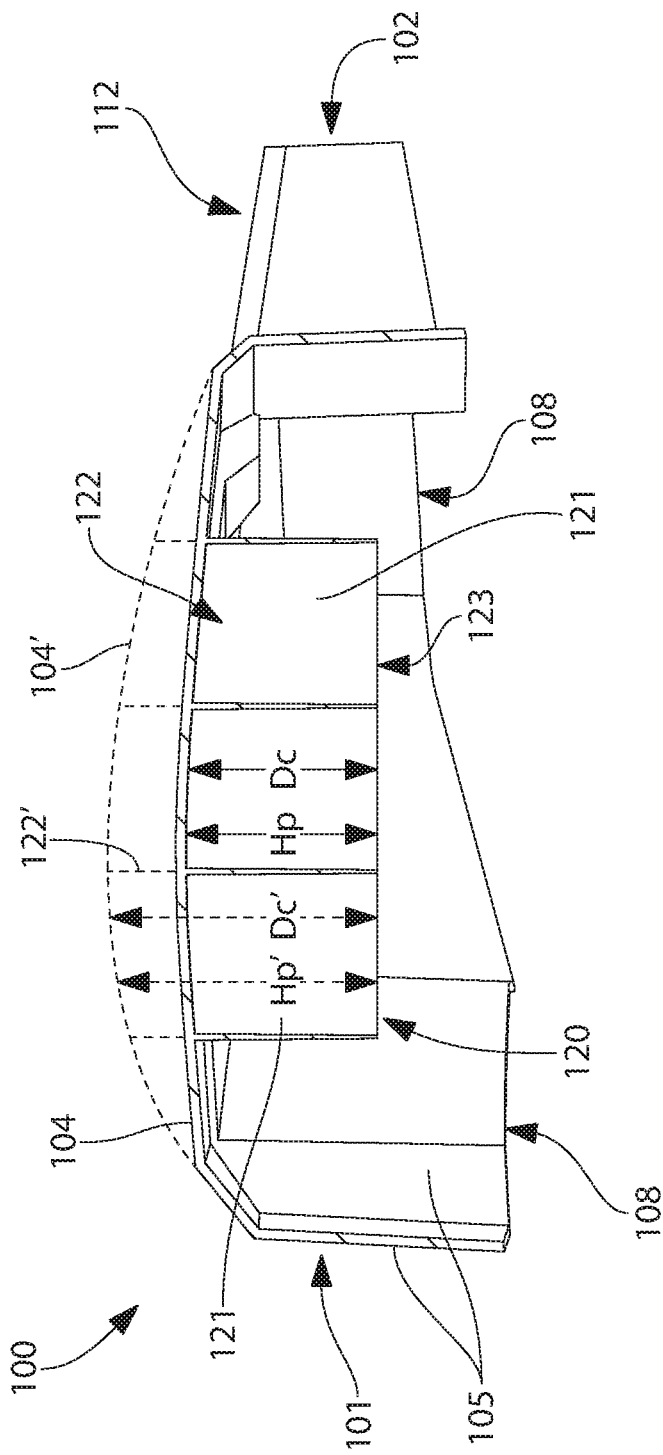
FIG. 18 is a longitudinal side elevation cross-sectional view thereof.
Figure 19:
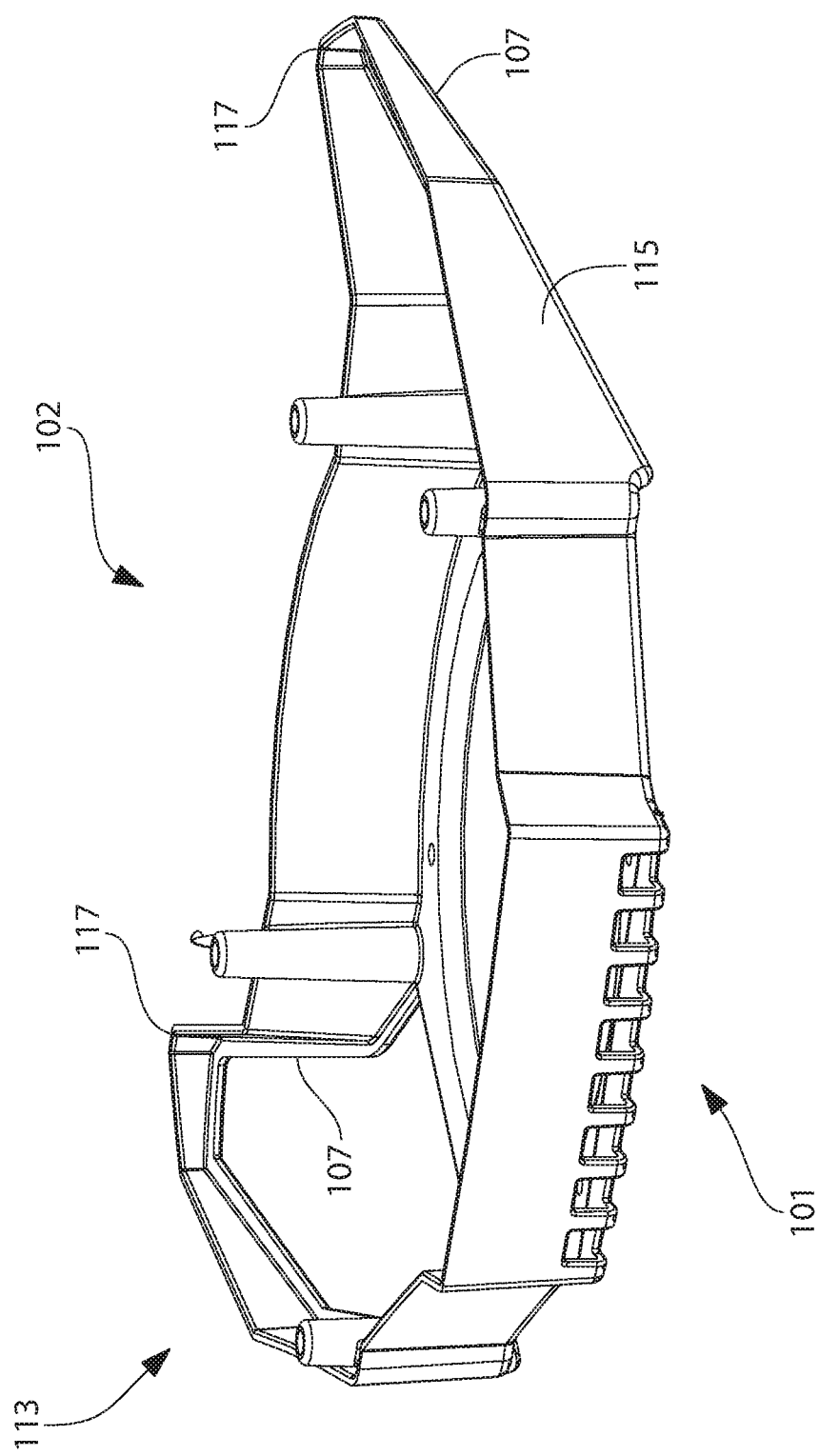
FIG. 19 is a front perspective view of a shroud base.
Figure 20:
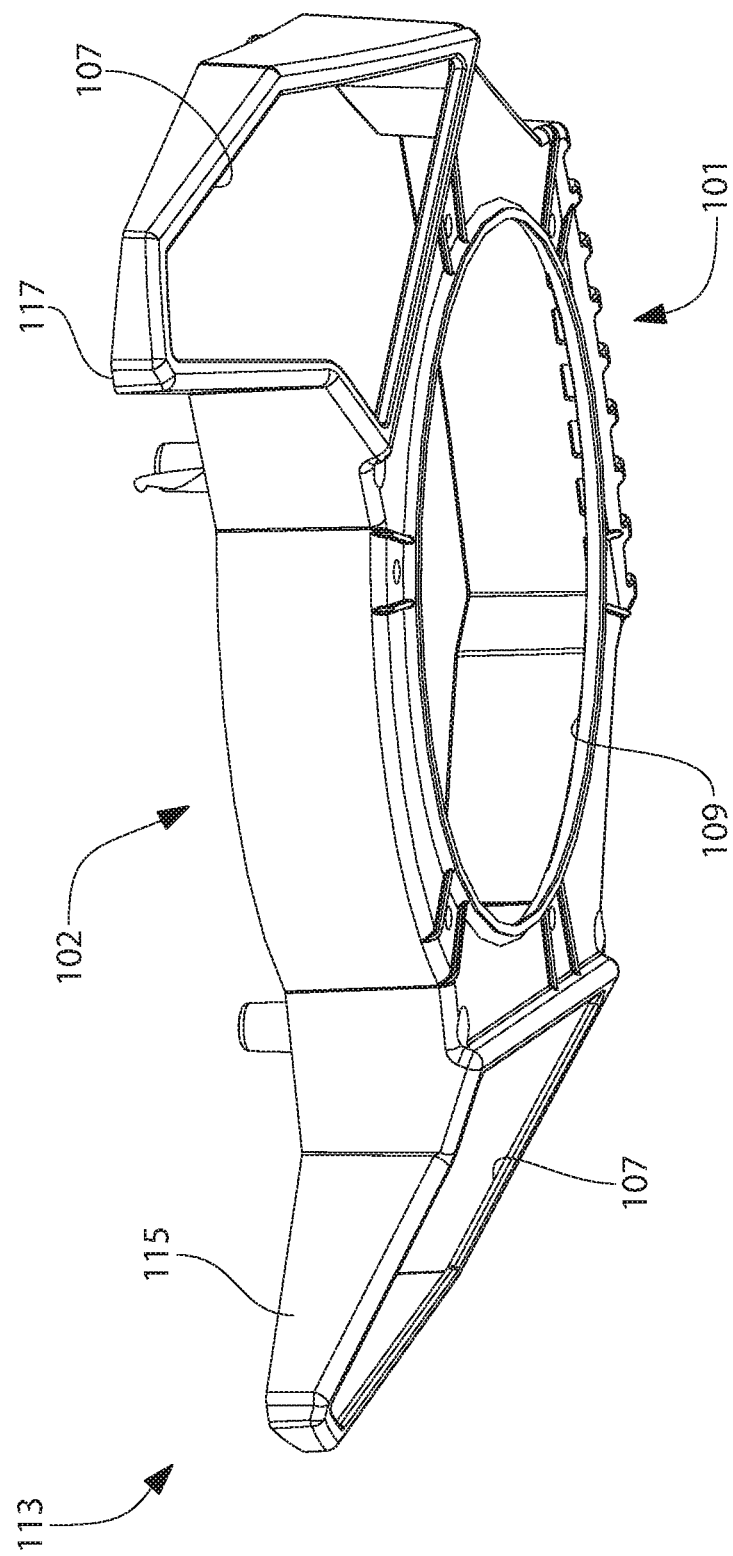
FIG. 20 is a bottom rear perspective view thereof.

Referring primarily to FIGS. 14, 17, and 18, quarter-wave resonator 120 in one shroud includes an array of multiple cells 121 formed by adjoining and/or intersecting grid partition members 122. Partition members 122 may be disposed inside internal cavity 106 of shroud 100. In some shroud configurations, the partition members 122 may be formed integrally with the shroud 100 as a unitary structural part of the shroud top wall 104 and/or vertical peripheral sidewalls 105. In instances where the shroud 100 may be formed of a polymer or plastic, partition members 122 may be integrally molded with the shroud. In other shroud configurations, partition members 122 may be separate elements which are insertable into and attachable to the shroud 100 as either a preassembled unit or as individual partition members 122 each separately attachable to the shroud. The partition members 122 may be attached to shroud 100 by any suitable method or combinations of methods including without limitation fasteners, snap fit, frictional fit, adhesives, welding, brazing, etc.

The partition members 122 may be configured and arranged to form corresponding cells 121 having any suitable polygonal or other shape desired (in bottom plan view), including for example without limitation square (as shown), rectangular, triangular, hexagon, octagon, circular, honeycomb, and others. Partition members 122 may have any suitable dimensions in both length Lp and width Wp (in bottom plan view), and in height Hp (in side elevation view) as shown for example in FIG. 14. The height Hp forming a distance between the bottom edge 123 and inside of top wall 104 of the shroud 100 defines a corresponding cell depth Dc for cells 121 (see, e.g. FIG. 18). In one shroud, the partition members 122 may have height Hp selected so that the bottom edge 123 of the partition members 122 is spaced vertically apart from the top 43 of the blower housing 40 to form a gap that avoids impeding the inflow of cooling air into the impeller 131.

The height Hp of partition members 122 may be different in various portions on the underside of shroud top wall 105 so that the cells 121 may have different depths Dc. This may be accomplished by configuring the top wall 104 differently in various areas of the shroud to decrease/increase the, or alternatively by adding intermediate horizontal walls (not shown) in various areas beneath the shroud. For example, in systems where the top wall 104 is slightly curved, the curved nature of the top wall 104 may create cells 121 with different depths Dc. Accordingly, in some shrouds, the partition member 122 height Hp and corresponding cell depth Dc may be either non-uniform or uniform depending on the intended sound frequencies to be attenuated by the quarter wave resonator 120.

The frequency of noise that may be reduced (by wave cancellation) through the use of quarter wave resonators 120 (and cells 121) may depend, at least in part, on the depth Dc of the cells 121. The depth Dc of the cell 121 may be tuned to reduce (or cancel) noise at a certain frequency (or frequency band). In some quarter wave resonators 120, some cells 121 may be configured to have different depths Dc such that some cells 121 may reduce (or cancel) noise at different frequencies than other cells 121. For example, as discussed, in systems where the top wall 104 is slightly curved (or otherwise not strictly horizontal), the cells 121 below the top wall 104 may have difference depths Dc. As such, the aggregate result may be that the quarter wave resonator 120 may be used to reduce (or cancel) noise at a wider range of frequencies.

Figure 27:
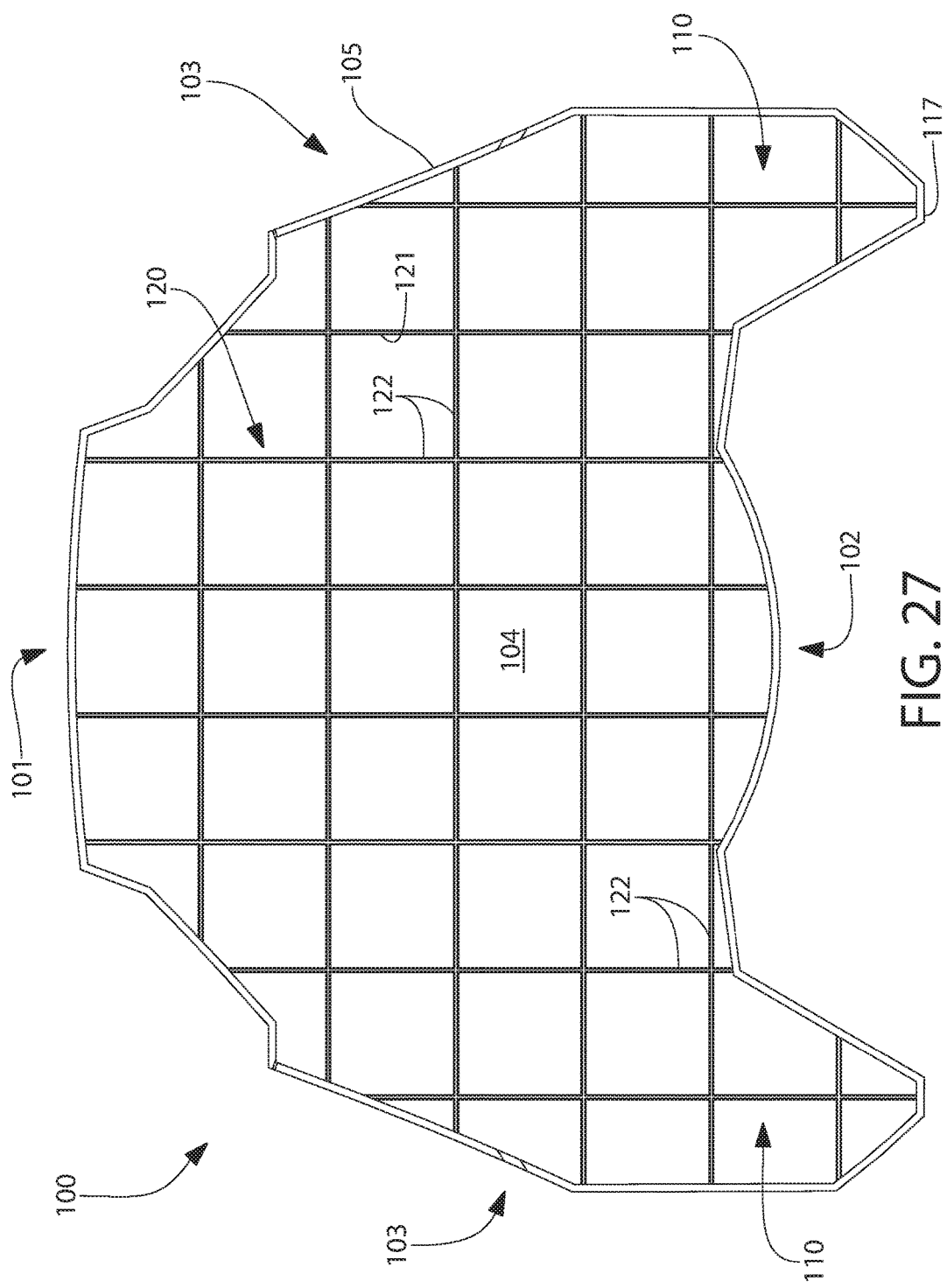
FIG. 27 is a bottom plan view of the shroud with a second configuration of a quarter wave resonator.

At least a portion of shroud 100 may include the quarter wave resonator 120 with associated partition members 122. In some shrouds, the partition members 122 may be concentrated towards the geometric center of the shroud 100 opposite the fan impeller 131 to attenuate noise emitted from the impeller. In other shrouds, various discrete portions of the cavity 106 within shroud 100 may include quarter wave resonators 120 with partition members 122 (e.g. opposite impeller, in portions of air inlet passages 110, etc.). In yet other shroud configurations, as shown in FIG. 27, substantially the entire cavity 106 may be filled by the quarter wave resonator 120 and partition members 122 to the extent permitted by the shroud geometry.

The quarter wave resonator 120 may be tuned for abating cooling air system noise within a specific range or band of frequencies by varying design parameters such as without limitation the extent of the shroud 100 which includes a quarter wave resonator 120, shape of the cells 121 formed by the partition members 122, depth of cells Dc, and materials of construction of the partition members 122. The sound attenuation performance of the shroud 100 may therefore be optimized by such tuning to compensate for and reduce the specific noise generation frequencies of a given engine system. Accordingly, the quarter wave resonator 120 may be configured and tuned to remove a narrow band or a broad band of noise frequencies.

Figure 26:
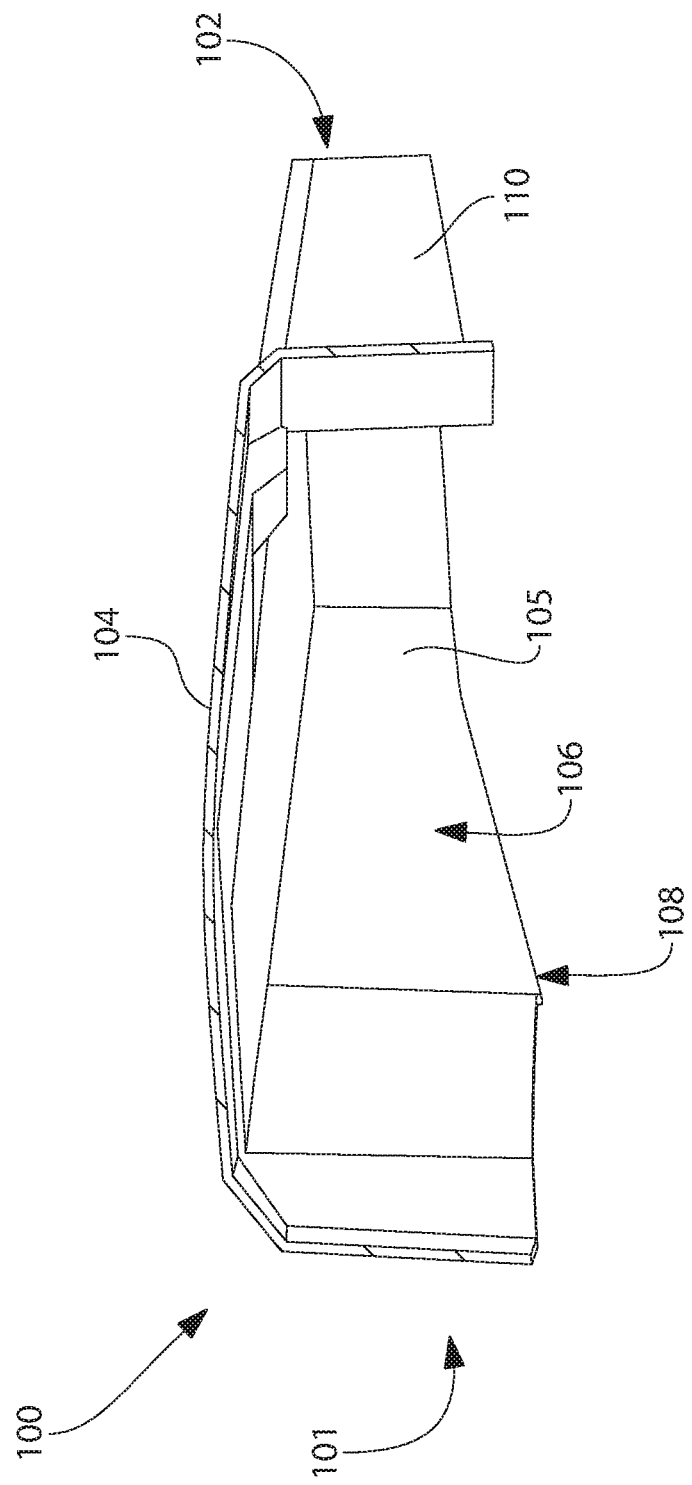
FIG. 26 is a side elevation cross-sectional view of the shroud.

In some shrouds, the quarter wave resonator 120 may be omitted as shown in FIG. 26 and the shroud 100 may rely on the air inlet passages 110 to attenuate system noise.

The shroud 100 (including base 113 and cover 112) and quarter wave resonator 120 may be made of any suitable metallic or non-metallic materials, including without limitation metals such as steel or aluminum, polymers/plastics (e.g. polyvinylchloride, acrylic, etc.), fiberglass, and others. In one example, the shroud 100 may be made of 20% glass filled polypropylene. The quarter wave resonator 120 partition members 122 may be made of the same or different material. The blower housing 40 in one example may be made of the same 20% glass filled polypropylene or another suitable material. Accordingly, the shroud, quarter wave resonator, and blower housing are not limited by materials of construction which are selected to provide the desired sound absorption characteristics and other performance factors as appropriate to suit a particular application.

Figure 28:
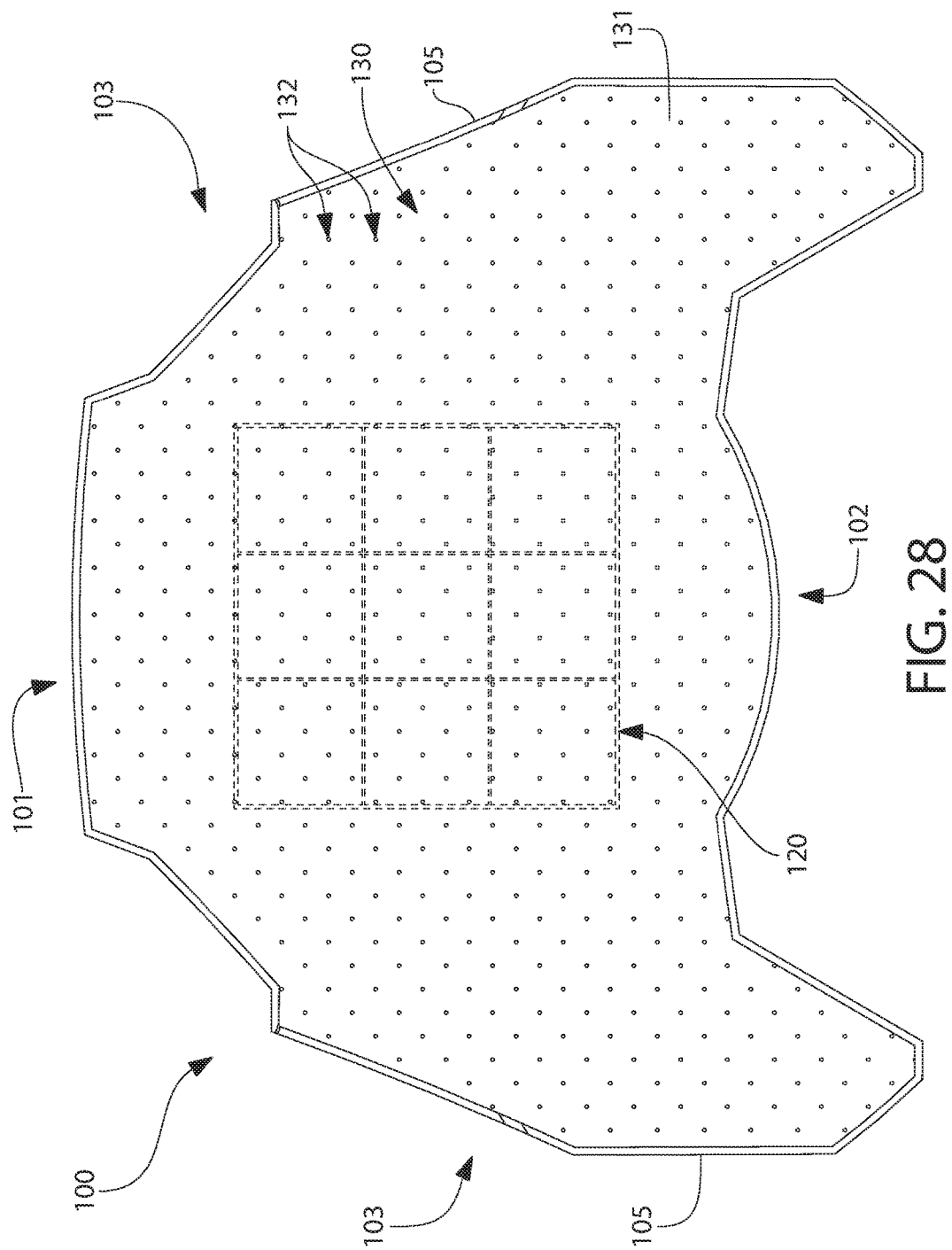
FIG. 28 is a bottom plan view of the shroud with a micro-perforated panel.
Figure 29:
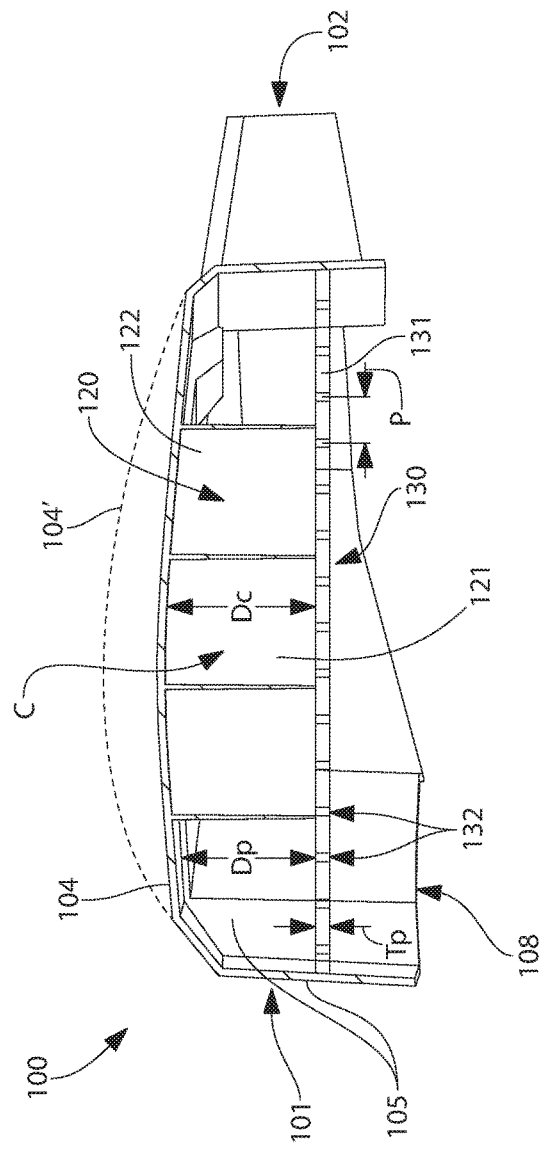
FIG. 29 is a longitudinal side elevation cross-sectional view thereof.

According to another aspect of the present disclosure, the noise suppression shroud 100 may include a micro-perforated panel (MPP) 130 for sound absorption in addition to or instead of quarter wave resonator 120. FIGS. 28 and 29 show a shroud 100 incorporating a micro-perforated panel 130 used in conjunction with a quarter wave resonator 120. The micro-perforated panel may be comprised of a substantially flat sheet 131 of material (e.g. metal) which includes a plurality of regularly spaced apart micro-sized pores or holes 132 of a predetermined diameter and pitch P (spacing between adjacent holes). The holes 132 may have the same diameter or non-uniform diameters, and be any suitable configuration including circular as commonly used or other shapes.

The micro-perforated panel 130 may be positioned at various locations within the shroud 100. The micro-perforated panel 130 may divide the shroud 100 into two or more separate cavities. For example, the micro-perforated panel 130 may be positioned horizontally through the shroud 100, dividing the shroud into a top cavity and a bottom cavity. In some such systems, the micro-perforated panel 130 may be positioned a depth Dp from the top wall 104 that is engineered or tuned to provide wave cancellation of certain undesirable noise frequencies, and/or such that the top wall 104 is positioned at a distance of lowest wave pressure from the micro-perforated plate 130. The micro-perforated panel 130 may be planar, or may have a curved, rippled, bent, or other surface. Other variations are possible.

The micro-perforated panel 130 may be positioned below the quarter wave resonator 120 between the bottom 108 of shroud 100 and the quarter wave resonator. In other shrouds, the micro-perforated panel 130 may be positioned above the quarter wave resonator 120 between top wall 104 of shroud 100 and the quarter wave resonator. An air-space C having a depth Dp may be formed behind the micro-perforated panel 130 below the top wall 104 of shroud 100. In this particular example, the depth Dp of the air space C may be coextensive with the height Hp of the partition members 122 and depth Dc of shroud 100 in the quarter wave resonator 120. Air space C associated with the micro-perforated panel 130 will accordingly be formed from a portion of the overall shroud cavity 106.

In one configuration of shroud 100, the micro-perforated panel 130 may enclose the entire bottom 108 of the shroud as shown. In other possible shrouds, the micro-perforated panel 130 may cover only portions of the bottom 108 of the shroud 100 such as over the areas which include a quarter wave resonator 120, or alternatively areas of the shroud that do not include quarter wave resonators.

Micro-perforated panels are effective for absorbing sound or noise within a predetermined attenuation frequency band or range based on the Helmholtz resonance principle, thereby reducing the resultant reflected sound. The attenuation frequency band may be customized to be narrow or wide by varying the design parameters of the micro-perforated panel. The pore or hole 132 size, spacing or pitch P, thickness Tp of the sheet 131, material of construction of sheet 131, and depth Dp of the air space C behind the sheet all affect the resultant noise cancellation properties of a micro-perforated panel and attenuation frequencies. Accordingly, the inventors have discovered that these parameters can be adjusted to change the noise cancellation characteristics of the micro-perforated panel 130 and tune the micro-perforated panel for filtering out specific fan frequencies to suit a given engine and associated cooling air system at hand. In some shrouds, the depth of Dp of air space C can be increased as desired by making the top wall 104 of the shroud domed or convex shaped as shown by the dashed top wall 104' in FIG. 29. These foregoing parameters may be adjusted to achieve the desired sound frequency filtering and attenuation characteristics for noise reduction.

In some systems, one or more of the hole 132 size, spacing or pitch P, and/or thickness Tp of the sheet 131 may vary within the same micro-perforated panel 130. For example, holes 132 near the center of the micro-perforated panel 130 may be sized differently from the holes 132 a larger radial distance from the center of the micro-perforated sheet 130. In this example, the holes 132 near the center of the micro-perforated panel 130 may enable or cause the micro-perforated panel 130 to absorb noise around a first frequency range (tuned to the parameters of the holes 132 at the center of the micro-perforated panel 130) near the center of the panel 130, while the holes 132 near the perimeter of the micro-perforated panel 130 may enable or cause the micro-perforated panel 130 to absorb noise around a different frequency range (tuned to the parameters of the holes 132 near the outer edges of the micro-perforated panel 130). Other variations are possible.

Referring to FIG. 29, the shroud 100 with micro-perforated panel 130 may also include partitions which in some designs may be configured similarly to the partition members 122 shown provided for the quarter wave resonator 120. The partition members 122 in such shrouds 100 may be constructed, positioned, and/or used to force a certain wave propagation (such as a linear plane wave propagation) between the micro-perforated panel 130 and the top wall 104. The forced wave propagation created by the partitions 122 may increase the noise attenuation and absorption characteristics of the shroud 100. The partitions for the micro-perforated panel 130 may or may not also behave as a quarter wave resonator, tuned for wave cancellation of certain frequencies of noise. The micro-perforated panel 130 may be positioned above, or below, the partition members 122.

Figure 30:
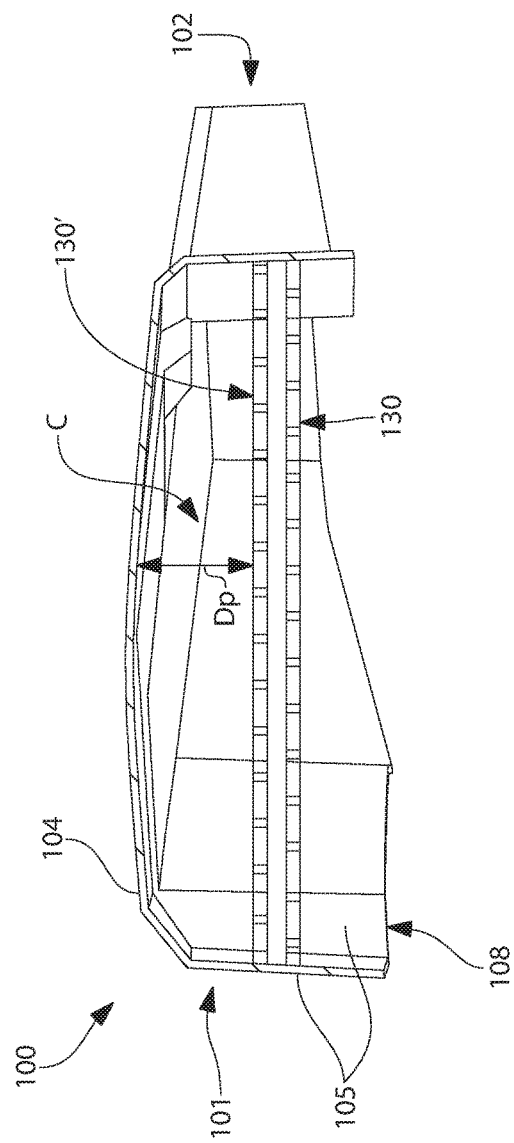
FIG. 30 is longitudinal side elevation cross-sectional view of a shroud having two micro-perforated panels.
Figure 31:
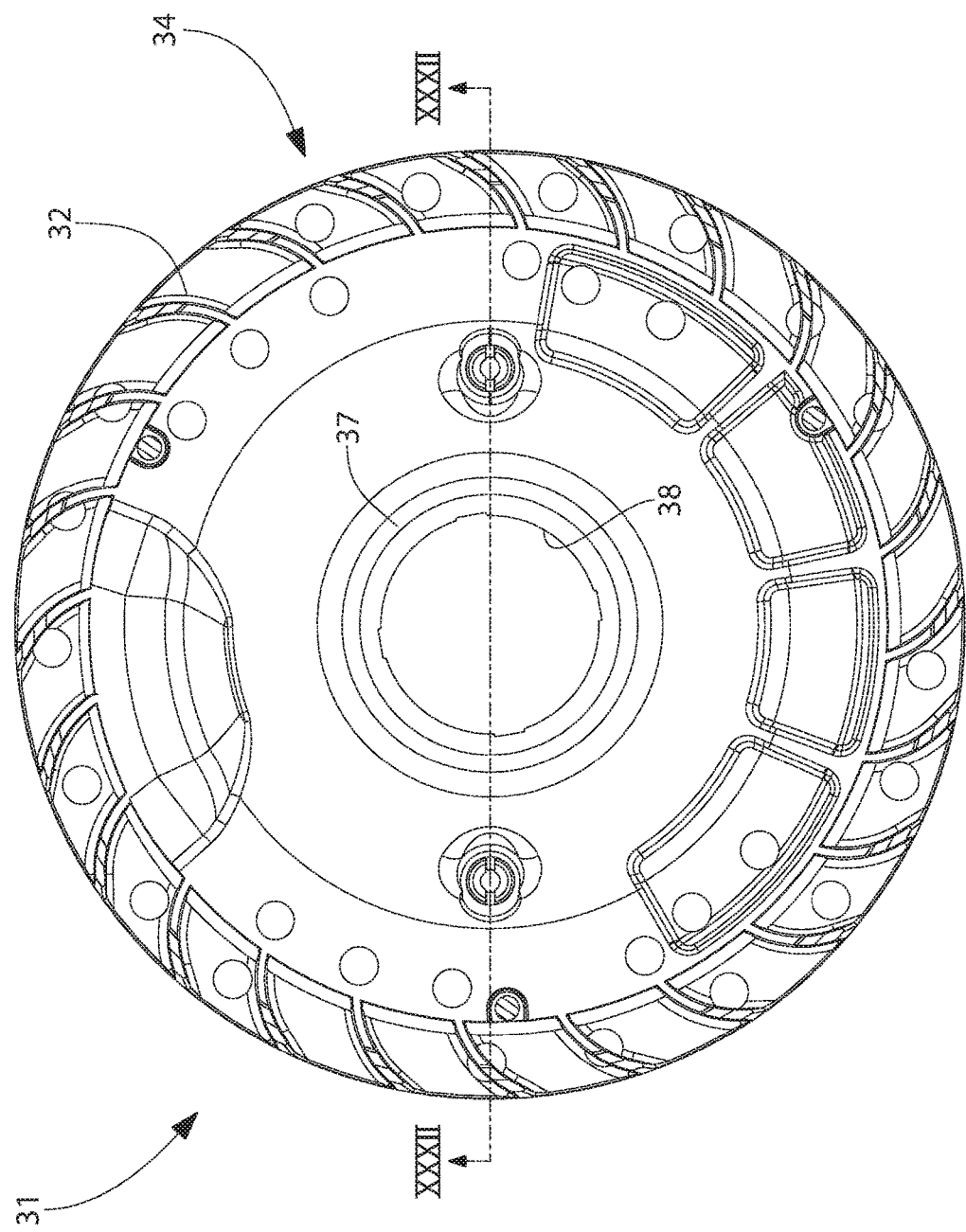
FIG. 31 is top plan view of a mono-pitch air blower impeller usable in the cooling air blower of FIG. 2 having blades which are equally spaced apart.
Figure 32:
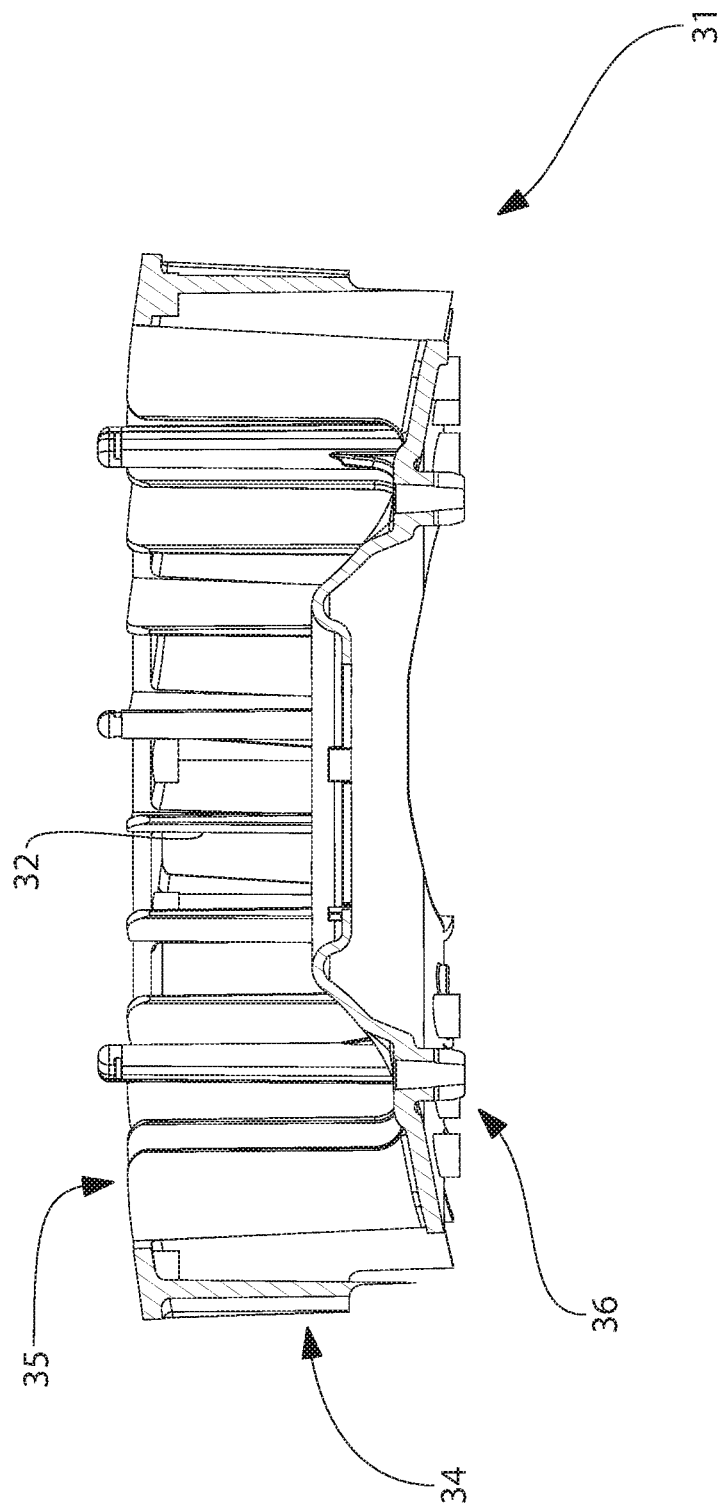
FIG. 32 is a cross-sectional view thereof.
Figure 33:
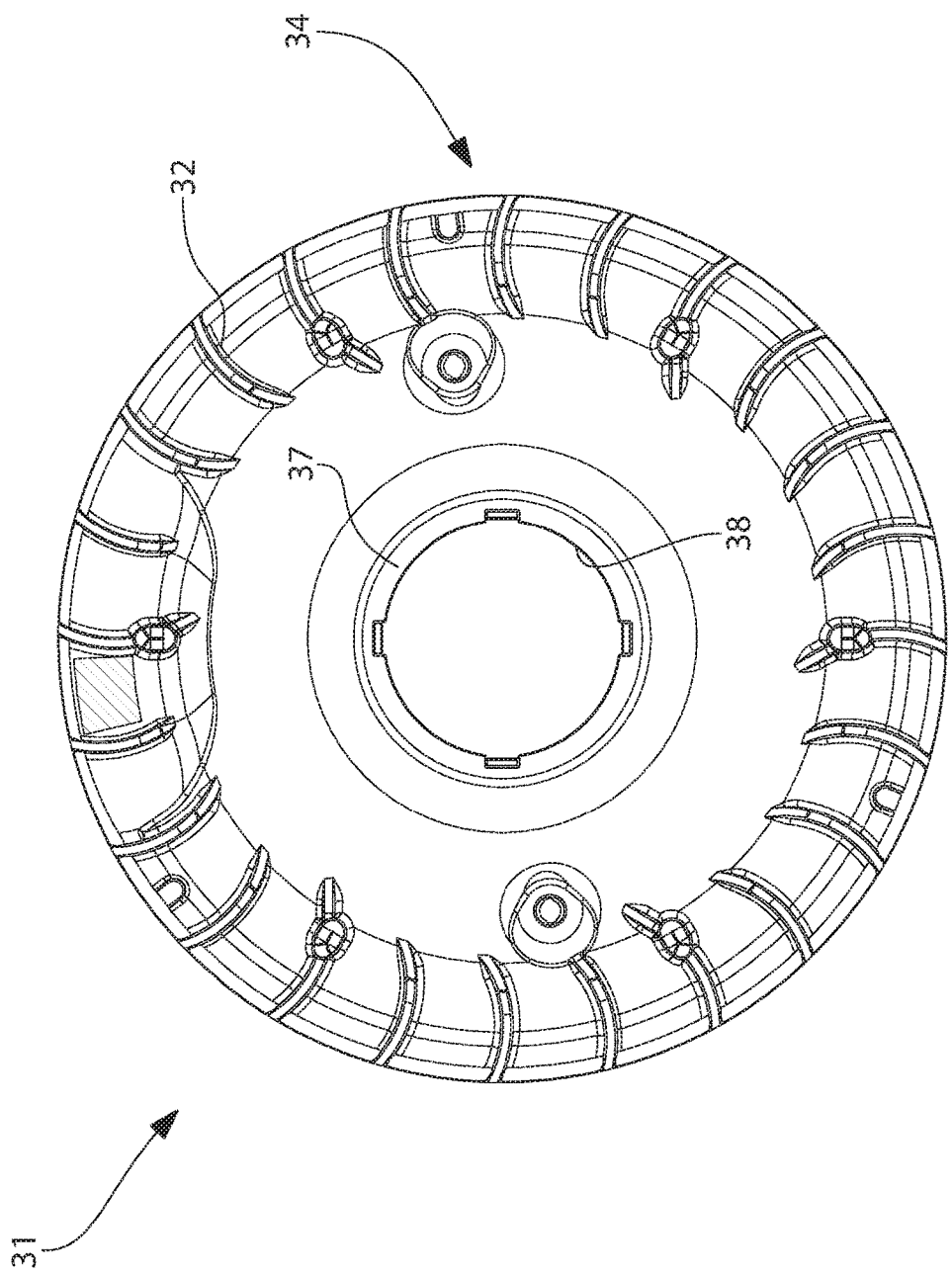
FIG. 33 is a bottom plan view thereof.
Figure 34:
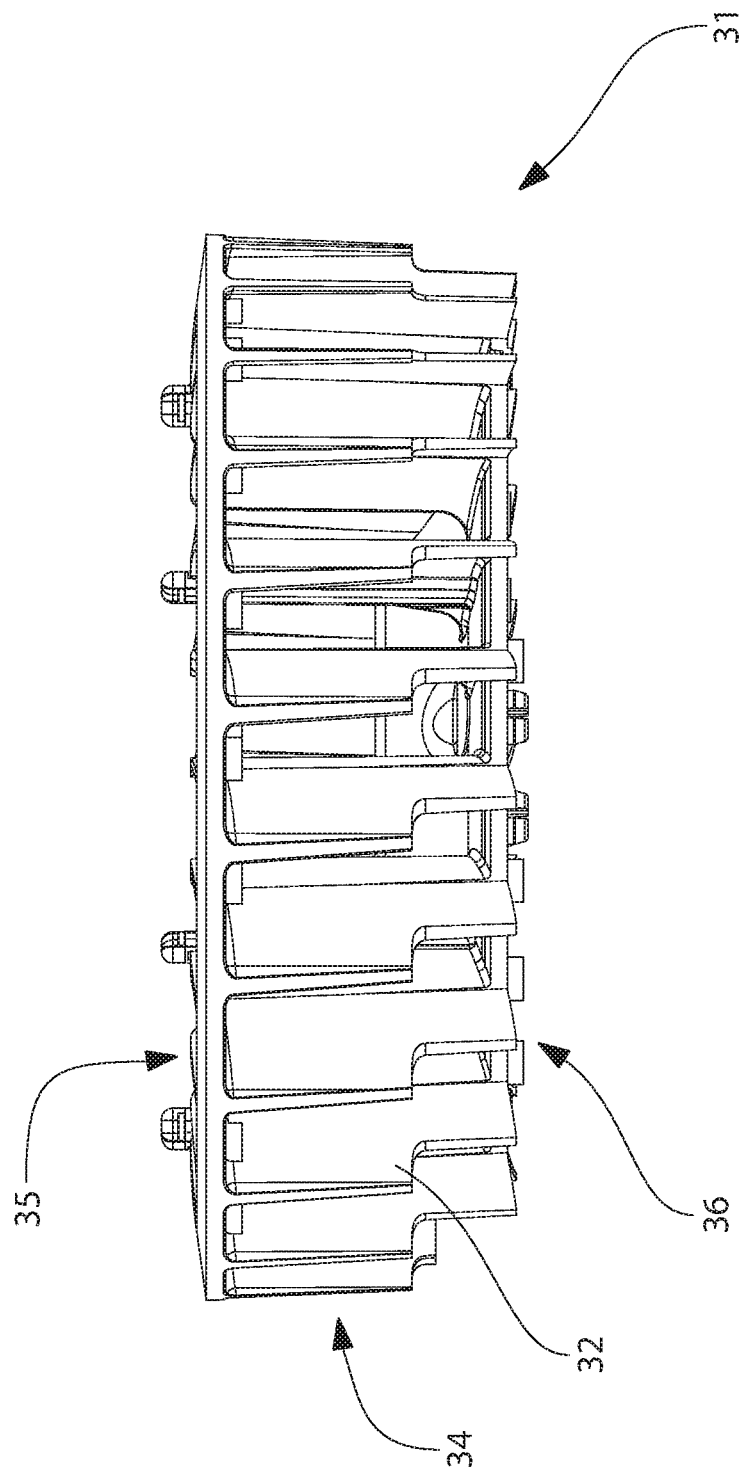
FIG. 34 is a side elevation view thereof.
Figure 35:
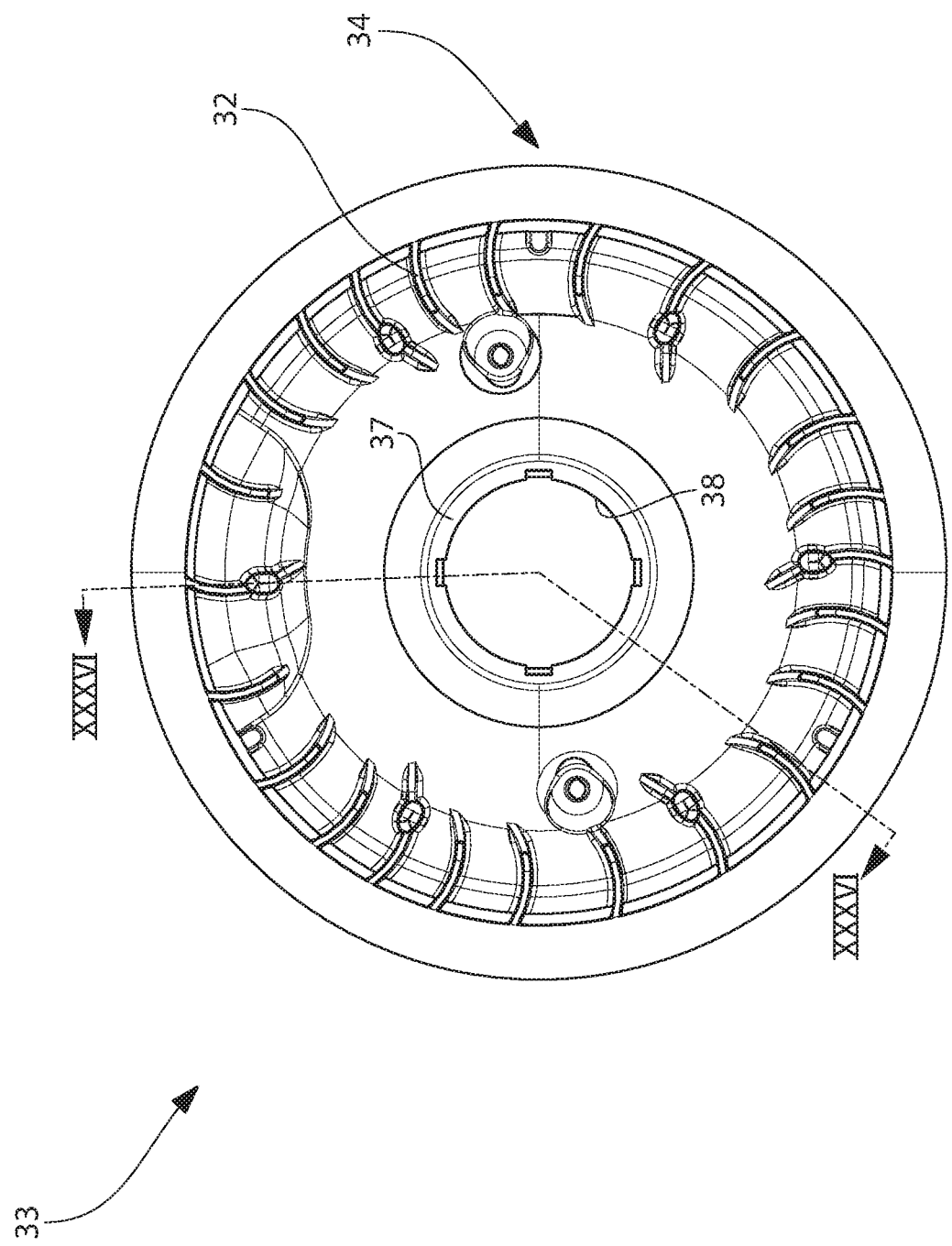
FIG. 35 is a bottom plan view of a modulated pitch air blower impeller usable in the cooling air blower of FIG. 2 having blades which are unequally spaced apart showing three different sinusoidal modulations.
Figure 36:
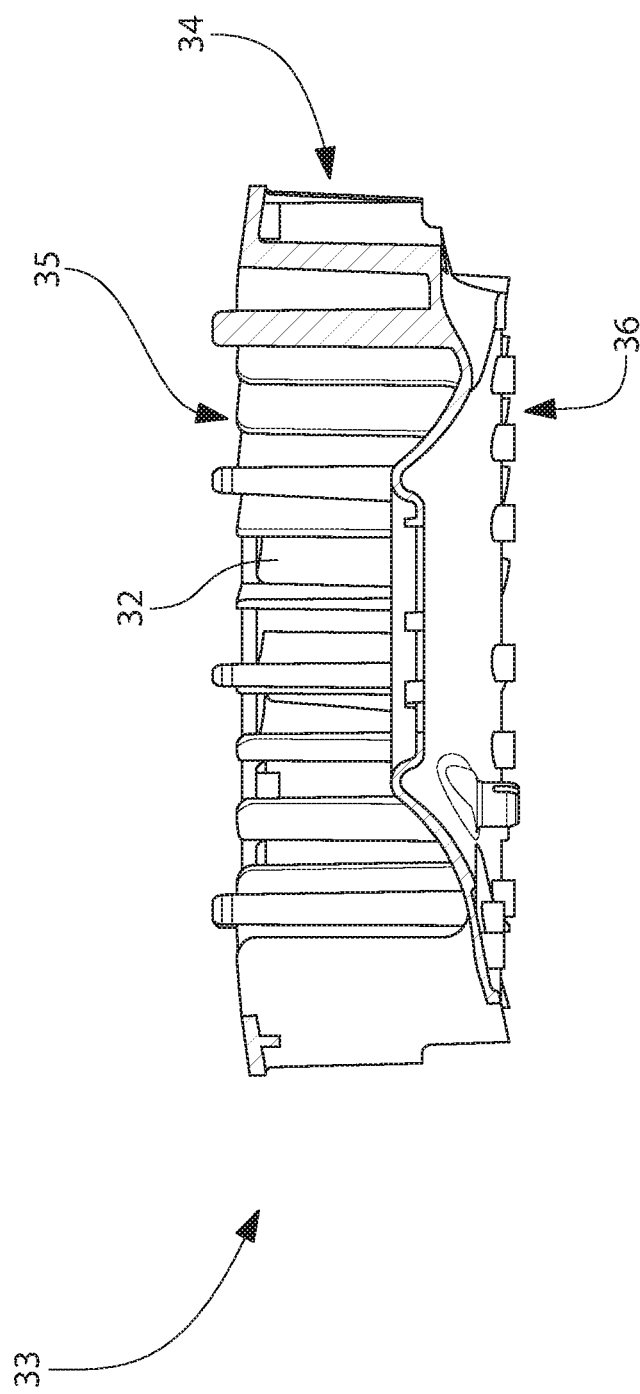
FIG. 36 is a cross-sectional side elevation view thereof.
Figure 37:
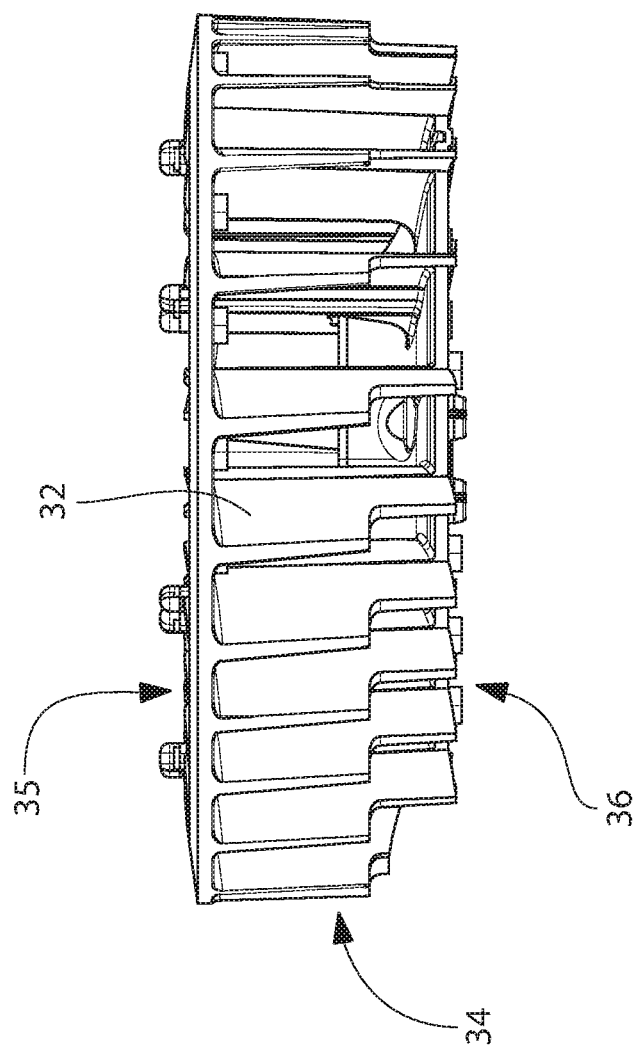
FIG. 37 is a side elevation view thereof.
Figure 38:
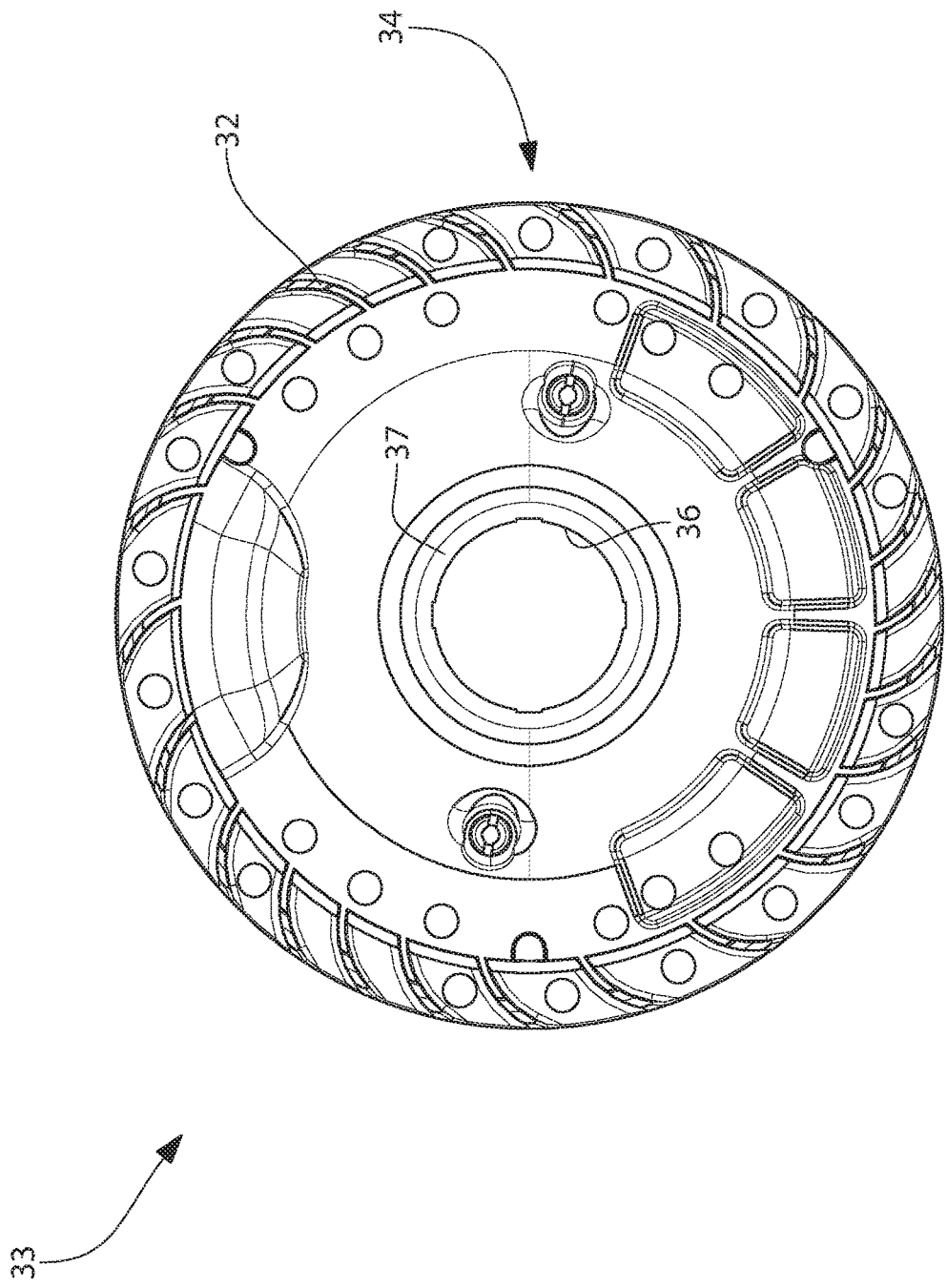
FIG. 38 is a bottom plan view thereof.

As shown in FIG. 30, more than one micro-perforated panel 130 may be used to broaden the range of frequencies absorbed by the panel. In the shroud 100 shown, two micro-perforated panels 130 and 130' are vertically arranged next to each other, and separated by an air gap. In other variations, the two panels 130 and 130' may be stacked together in contact with each other. Each of the panels 130 and 130' may have different sound absorption characteristics by providing different hole 132 size, spacing or pitch P, thickness Tp of the sheet 131, or materials of construction of the sheet for each panel. Accordingly, a system with two panels 130 and 130', each with different sound absorption characteristics, may absorb sound at a wider range of frequencies than a system with only one panel 130. In other variations, the sheets 130 and 130' may be identical. Additionally, the air gap between the two micro-perforated panels 130 and 130' may be constructed such that the distance between the two panels 130 and 130' provides additional wave cancellation and/or low wave pressure properties. Due to the construction and configuration of the spacing, acoustic cancellation may occur as sound/noise waves reflect between the panels 130 and 130' and also are re-directed back towards matching waves. Sound waves in opposite directions with equal or close frequencies will tend to cancel each other (attenuation).

As also shown in FIG. 30 and noted above, one or multiple micro-perforated panels 130, 130', etc. may be used alone without quarter wave resonator 120. It will be appreciated, however, that multiple micro-perforated panels 130 may also be used with a quarter wave resonator 120.

In one example of a micro-perforated panel 130, the holes may have a diameter ranging from and including 0.05 mm to 0.5 mm. The holes may be formed by any suitable method, including without limitation laser cutting or other suitable methods. The micro-perforated panel sheet 131 may be made of any suitable metallic or non-metallic materials, including without limitation metals such as steel or aluminum, polymers/plastics (e.g. polyvinylchloride, acrylic, etc.), fiberglass, and others. Accordingly, micro-perforated panel 130 is not limited by materials of construction which are selected to provide the desired sound absorption characteristics suited for a particular application.

In some variations of a micro-perforated panel, the peripheral edges of micro-perforated panel 130 may be sealed to the inside of shroud 100 along vertical sidewalls 105 to create a substantially air tight air space C between the shroud and panel to minimize reflected sound leakage between the panel edges and the shroud. Reflected noise or sound from air space C behind the panel will therefore only have a pathways back out through the panel holes 132. The edges of micro-perforated panel 130 may be sealed by any suitable method including without limitation caulking or sealants, gaskets, welding (e.g. metal or sonic for plastics depending on the materials used for the shroud and panel), and others.

Figure 39:
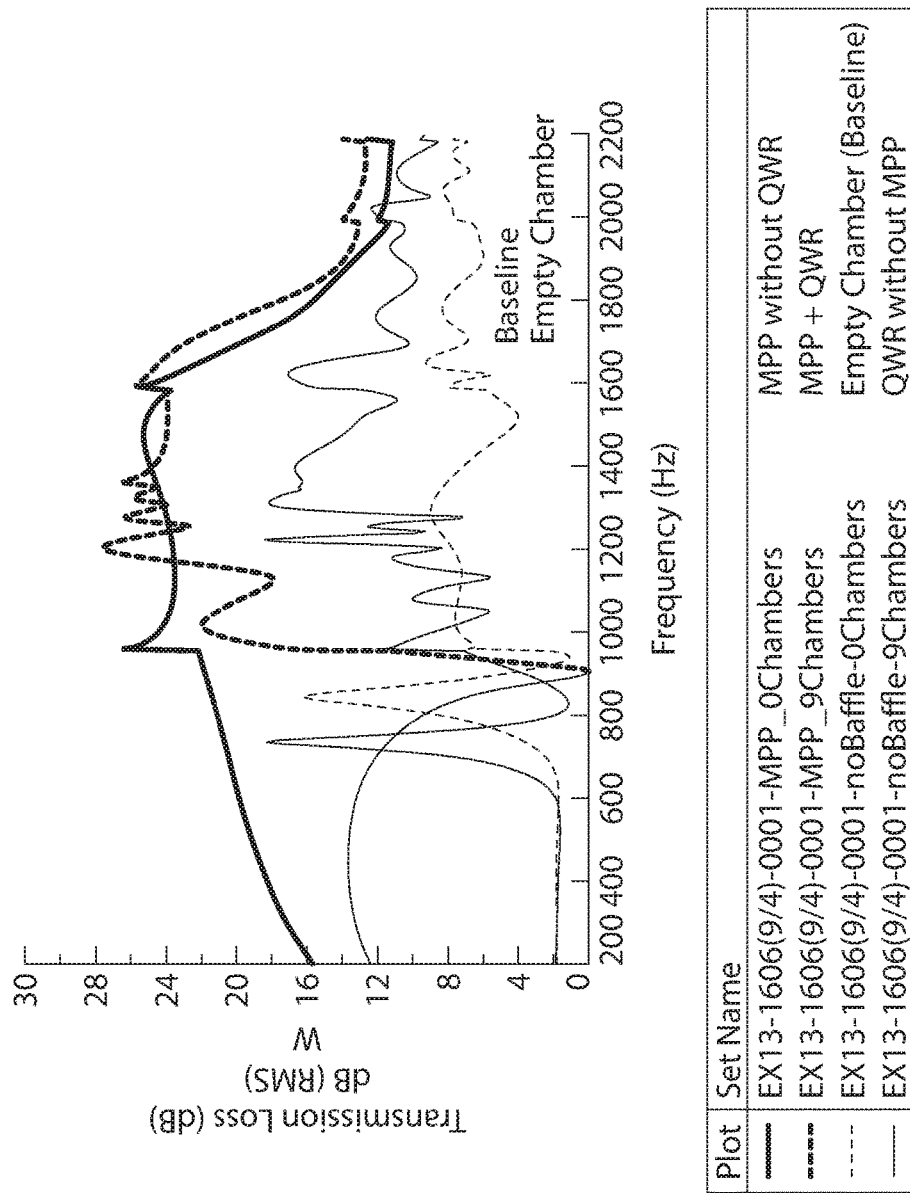
FIG. 39 is a graph showing sound transmission loss predictive modeling results

The inventors conducted predictive computer modeling of the shroud 100 to determine the potential sound transmission loss which could be achieved by various combinations of a shroud with and without some of the foregoing noise suppression features disclosed herein. The resultant transmission loss curves are shown in FIG. 39. The baseline curve results (light-weight dashed line) represents an empty shroud and air inlet passages 110 without quarter wave resonator or micro-perforated panel, thereby relying on only the cooling air passages and shroud body for sound attenuation. The addition of a quarter wave resonator 120 was modeled having a 9×9 cell array (9 chambers as identified in FIG. 39) as described herein (light-weight sold line curve) to determine its effect on noise suppression performance of the shroud. The effect of adding a micro-perforated panel 130 was modeled both alone in the shroud 100 (heavy-weight solid line curve) and in combination with the 9×9 cell quarter wave resonator 120 (heavy-weight dashed line curve).

As seen in the results of this modeling, the noise suppression performance (i.e. highest decibel sound transmission loss) of a shroud 100 incorporating micro-perforated panel 130 either alone or with quarter wave resonator 120 was generally better over a wide band or range of frequencies than shrouds without the micro-perforated panel. The addition of a quarter wave resonator alone also demonstrated generally better performance than an empty shroud. It will be appreciated, however, that even the empty shroud 100 incorporating the specially configured and positioned air inlet passages 110 provides improved noise reduction and isolation performance, both of which may be even further improved through the use of fibrous absorptive materials. The results of this modeling further demonstrates that the shroud and noise suppression features disclosed herein are each highly customizable from a noise suppression standpoint and may be combined in various combinations to achieve a desired sound attenuation levels at various frequency bands or ranges of interest for a given application.

In view of the foregoing discussion and computer-aided modeling, it will be appreciated that the shroud 100 structure itself with air inlet passages 110 may be considered to provide a baseline noise reduction being tuned to actively reduce fan noise within a certain first frequency range or band and degree of noise reduction (i.e. decibel or sound pressure). A quarter wave resonator 130 or micro-perforated panel 130 may be added which functions to reduce noise in a second frequency range or band which in concert with the air inlet passages 110 have a cumulative noise reduction effect. For systems with micro-perforated panels 130, partitions 122 may be added to provide a forced linear wave propagation that may further reduce noise of the system. The remaining one of the quarter wave resonator 120 or micro-perforated panel 130 not used may, in some systems, be added which functions to reduce noise in a third frequency range or band have a further cumulative noise reduction effect. Any of these systems may also include fibrous absorptive material which may be constructed to provide attenuation over a desired frequency range based on the absorptive coefficient of the fibrous material.

Any of the first, second, or third frequencies ranges may be the same, effecting an increased noise reduction over that frequency range. For example, a shroud may include a micro-perforate panel 130 constructed to absorb sound at a frequency range of 800 Hz to 1000 Hz, while the quarter wave resonators 120 may be constructed with a depth Dc to cancel waves in the same or an overlapping frequency range. In other examples, the first, second, or third frequency ranges may be different to reduce noise over a wider frequency range than either range individually. The combined reduction of fan noise by employing some or all of the foregoing sound reduction features may therefore operate to provide significant or maximum noise reduction over a desired and focused spectrum of frequencies, and/or attenuate sound over a wide spectrum of frequencies thereby providing a high degree of customization to the noise suppression system described herein.

According to another aspect of the prevent disclosure, a micro-perforated panel 130 may be cooperatively designed in conjunction with the type of fan impeller selected to optimize the performance of the shroud noise reduction system. The mono-pitch impeller 31 (equal circumferential blade spacing) or modulated impeller 33 (unequal circumferential blade spacing) designs each have different noise generation characteristics. For example, mono-pitch impellers 31 may typically produce the greatest levels of noise at a narrow (and sometimes higher) frequency bands than the modulated impeller 33 design. With either design, the blade spacing and configuration of the impeller may be selected to intentionally constrain the greatest noise levels to within a predetermined frequency range which coincides with the frequency range for which a micro-perforated panel 130 has been designed to attenuate those same frequencies. For example, an engine 26 may have a mono-pitch (equal blade spacing) impeller 31 which was intentionally designed to generate the greatest level of noise within a first band of frequencies from about 1040 Hz to 1560 Hz. Impeller noise falling outside of this range will be lower and may be at acceptable levels in some instances. The micro-perforated panel 130, through manipulating its design parameters as described above (e.g. hole spacing, pitch, panel thickness, etc.), may then be specifically designed to have the noise suppression characteristic of operably attenuating sound falling within the same band of frequencies as the impeller from about 1040 Hz to 1560 Hz over a given engine speed. The end result is attenuation of impeller noise over a relatively wide range or band of frequencies including minimizing the most offensive peak frequencies of the impeller. Accordingly, while the use of a mono-pitched impeller 31 may otherwise be undesirable due to the increased noise at a narrow frequency band, the use of micro-perforated plates 130 and/or quarter wave resonators 120 tuned to reduce (through absorption or wave cancellation) noise within that frequency may result in a quieter engine than one with a modulated-pitch impeller 33.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An internal combustion engine and noise suppression system comprising:
   a cylinder of the internal combustion engine comprising at least one cooling fin;
   a cooling air inlet passage;
   an engine cooling fan that directs air through the cooling air inlet passage toward the at least one cooling fin;
   a shroud positioned above and in fluid communication with the engine cooling fan, the shroud comprising a quarter wave resonator tuned to attenuate noise within a first range of frequencies generated by the engine cooling fan; and
   a micro-perforated panel proximate the quarter wave resonator in the shroud, the micro-perforated panel tuned to attenuate the noise within a second range of frequencies.

2. The system according to claim 1, wherein the quarter wave resonator is disposed in a downwardly open internal cavity of the shroud which is arranged adjacent to the engine cooling fan.

3. The system according to claim 1, wherein the quarter wave resonator is disposed above the engine cooling fan.

4. The system according to claim 1, wherein the quarter wave resonator is spaced vertically apart from the engine cooling fan.

5. The system according to claim 1, wherein the quarter wave resonator comprises an array of cells, each cell of the array of cells having a depth, the depth selected to attenuate the noise within the first range of frequencies.

6. The system according to claim 5, wherein the array of cells comprise a first group of cells having a first depth selected to attenuate the noise within the first range of frequencies, and a second group of cells having a second depth different than the first depth and selected to attenuate noise within a different range of frequencies.

7. The system according to claim 6, wherein the shroud includes a top wall having a curved profile, the first group of cells being disposed in a central portion of the top wall and the second group of cells being disposed in peripheral portions of the top wall.

8. The system according to claim 1, wherein the micro-perforated panel comprises a smooth sheet of material having a plurality of holes of a predetermined diameter and pitch.

9. The system according to claim 8, wherein a first array of the holes have a first diameter to attenuate noise generated by the engine cooling fan within the second range of frequencies; and a second array of the holes have a second diameter different than the first diameter to attenuate noise generated by the engine cooling fan within a third second range of frequencies.

10. The system according to claim 1, wherein the micro-perforated panel divides an internal cavity of the shroud into a top cavity and a bottom cavity.

11. The system according to claim 10, wherein the quarter wave resonator is disposed in the top cavity.

12. An internal combustion engine and noise suppression system comprising:
    a cylinder of the internal combustion engine comprising at least one cooling fin;
    a cooling air inlet passage;
    an engine cooling fan that directs air through the cooling air inlet passage toward the at least one cooling fin; and
    a shroud in fluid communication with the engine cooling fan and including a top wall which forms a part of the cooling air inlet passage, the shroud comprising a first micro-perforated panel of uniform thickness comprising a plurality of holes tuned to attenuate noise within a first range of frequencies generated by the engine cooling fan;
    wherein the first micro-perforated panel is arranged in a first horizontal plane above the engine cooling fan and divides an internal cavity of the shroud into a top cavity above the first micro-perforated panel between the top wall of the shroud and first micro-perforated panel, and a bottom cavity between the engine cooling fan and first micro-perforated panel;
    wherein the top cavity has depth measured from the top wall of the shroud to the first micro-perforated panel that is tuned to provide wave cancellation of noise within the first range of frequencies.

13. The system according to claim 12, wherein the first micro-perforated panel is disposed in a downwardly open internal cavity of the shroud which is arranged adjacent to the engine cooling fan.

14. The system according to claim 12, wherein a first array of holes have a first diameter to attenuate noise generated by the engine cooling fan within the first range of frequencies, and a second array of holes have a second diameter different than the first diameter to attenuate noise generated by the engine cooling fan within a second range of frequencies.

15. The system according to claim 12, further comprising a second micro-perforated panel disposed in the shroud proximate the first micro-perforated panel, the second micro-perforated panel tuned to attenuate noise generated by the engine cooling fan within a second range of frequencies.

16. An internal combustion engine and noise suppression system comprising:
- the internal combustion engine comprising a cylinder;
- an engine cooling fan associated with the engine, the engine cooling fan operable to direct cooling air downwards towards the engine to dissipate heat generated by the engine;
- an air passage disposed above the engine and in fluid communication with the engine cooling fan;
- a noise suppression device arranged in the air passage, the noise suppression device arranged to intercept and attenuate noise within a first range of frequencies generated by the engine cooling fan;
- wherein the noise suppression device comprises a planar micro-perforated panel including a smooth sheet of material having a plurality of holes of a predetermined diameter and pitch, the micro-perforated panel tuned to attenuate noise within a first range of frequencies generated by the engine cooling fan;
- wherein the noise suppression device further comprises a quarter wave resonator including a plurality of cells each having a depth, the quarter wave resonator tuned to attenuate noise within a first range of frequencies generated by the engine cooling fan.

* * * * *